United States Patent
Gass et al.

(10) Patent No.: US 9,925,683 B2
(45) Date of Patent: Mar. 27, 2018

(54) TABLE SAWS

(71) Applicant: SD3, LLC, Tualatin, OR (US)

(72) Inventors: Stephen F. Gass, West Linn, OR (US);
J. David Fulmer, West Linn, OR (US);
David A. Fanning, Vancouver, WA (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 14/862,571

(22) Filed: Sep. 23, 2015

(65) Prior Publication Data
US 2016/0008997 A1 Jan. 14, 2016

Related U.S. Application Data

(60) Continuation of application No. 12/806,829, filed on Aug. 20, 2010, now Pat. No. 9,522,476, which is a
(Continued)

(51) Int. Cl.
*B26D 7/24* (2006.01)
*B27G 19/02* (2006.01)
(Continued)

(52) U.S. Cl.
CPC ............ *B26D 7/24* (2013.01); *B27G 19/02* (2013.01); *G05B 9/02* (2013.01); *B27B 5/38* (2013.01)

(58) Field of Classification Search
CPC .......... B27G 21/00; B27G 19/02; B26D 7/24; B27B 5/38; B23Q 11/06; F16P 3/06; F16P 3/12; Y10T 83/089; Y10T 83/081; G05B 9/02; B23D 59/001; H01H 9/26

USPC .......... 83/DIG. 1, 58, 62, 62.1, 63, 72, 76.7, 83/788, 581, 471.2, 477.1, 477.2, 522.12, 83/526, 397.1; 144/154.5, 356, 384, 391, 144/427, 286.5; 29/708, 254, 413; 324/550, 424; 408/5; 56/10.9, 11.3; 192/192 A, 129 R, 130; 102/202.7; 89/1.56; 137/68.12, 72, 76; 188/5, 6,
(Continued)

(56) References Cited

U.S. PATENT DOCUMENTS

| 146,886 A | 1/1874 | Doane et al. |
|---|---|---|
| 162,814 A | 5/1875 | Graves et al. |

(Continued)

FOREIGN PATENT DOCUMENTS

| CA | 2140991 | 1/1995 |
|---|---|---|
| CH | 297525 | 6/1954 |

(Continued)

OTHER PUBLICATIONS

Sink Drain Plug Lifter, circa 1974.
(Continued)

*Primary Examiner* — Jason Daniel Prone

(57) ABSTRACT

Table saws with safety systems are disclosed. The safety systems detect and react to dangerous conditions, such as contact between the blade and a person. The table saws may include a switch, a first light that illuminates to indicate the safety system is operable, and a second light that illuminates to indicate that the safety system is inoperable. The switch may not power the saw when switched on if the second light is illuminated.

1 Claim, 16 Drawing Sheets

Related U.S. Application Data continuation of application No. 09/929,426, filed on Aug. 13, 2001, now Pat. No. 7,210,383, said application No. 12/806,829 is a continuation of application No. 12/655,695, filed on Jan. 4, 2010, now Pat. No. 8,006,595, which is a continuation of application No. 11/975,985, filed on Oct. 22, 2007, now Pat. No. 7,640,835, which is a continuation of application No. 09/929,221, filed on Aug. 13, 2001, now Pat. No. 7,284,467, said application No. 12/806,829 is a continuation of application No. 12/002,388, filed on Dec. 17, 2007, now Pat. No. 8,011,279, which is a continuation of application No. 09/929,227, filed on Aug. 13, 2001, now Pat. No. 7,308,843, said application No. 12/806,829 is a continuation of application No. 11/401,050, filed on Apr. 10, 2006, now Pat. No. 7,788,999, which is a continuation of application No. 09/929,240, filed on Aug. 13, 2001, now Pat. No. 7,100,483, said application No. 11/401,050 is a continuation of application No. 09/929,241, filed on Aug. 13, 2001, now Pat. No. 7,024,975, said application No. 11/401,050 is a continuation of application No. 09/929,425, filed on Aug. 13, 2001, now Pat. No. 7,137,326, said application No. 11/401,050 is a continuation of application No. 10/172,553, filed on Jun. 13, 2002, now Pat. No. 7,231,856, said application No. 11/401,050 is a continuation of application No. 10/189,027, filed on Jul. 2, 2002, now Pat. No. 7,712,403, said application No. 11/401,050 is a continuation of application No. 10/243,042, filed on Sep. 13, 2002, now Pat. No. 7,197,969, said application No. 11/401,050 is a continuation of application No. 10/643,296, filed on Aug. 18, 2003, now abandoned, said application No. 11/401,050 is a continuation of application No. 10/794,161, filed on Mar. 4, 2004, now Pat. No. 7,098,800, said application No. 12/806,829 is a continuation of application No. 12/800,607, filed on May 19, 2010, now Pat. No. 7,895,927, which is a continuation of application No. 11/542,938, filed on Oct. 2, 2006, now abandoned, which is a continuation of application No. 10/984,643, filed on Nov. 8, 2004, now Pat. No. 8,061,245, which is a continuation of application No. 09/929,226, filed on Aug. 13, 2001, now Pat. No. 6,920,814, said application No. 10/984,643 is a continuation of application No. 09/929,240, filed on Aug. 13, 2001, now Pat. No. 7,100,483, said application No. 09/929,226 is a continuation of application No. 09/929,242, filed on Aug. 13, 2001, now Pat. No. 7,509,899, said application No. 10/984,643 is a continuation of application No. 10/051,782, filed on Jan. 15, 2002, now Pat. No. 6,877,410, said application No. 10/984,643 is a continuation of application No. 10/052,806, filed on Jan. 16, 2002, now Pat. No. 6,880,440, said application No. 10/984,643 is a continuation of application No. 10/205,164, filed on Jul. 25, 2002, now Pat. No. 6,945,149, said application No. 10/984,643 is a continuation of application No. 10/202,928, filed on Jul. 25, 2002, now Pat. No. 7,000,514, said application No. 10/984,643 is a continuation of application No. 10/785,361, filed on Feb. 23, 2004, now Pat. No. 6,997,090, which is a continuation of application No. 10/215,929, filed on Aug. 9, 2002, now abandoned, said application No. 11/542,938 is a continuation of application No. 11/401,774, filed on Apr. 11, 2006, now Pat. No. 7,525,055, which is a continuation of application No. 11/027,322, filed on Dec. 31, 2004, now abandoned, said application No. 11/542,938 is a continuation of application No. 11/445,548, filed on Jun. 2, 2006, now Pat. No. 7,347,131, which is a continuation of application No. 11/506,260, filed on Aug. 18, 2006, now Pat. No. 7,359,174, which is a continuation of application No. 10/923,282, filed on Aug. 20, 2004, now abandoned, said application No. 12/806,829 is a continuation of application No. 12/590,094, filed on Nov. 2, 2009, now Pat. No. 7,958,806, which is a continuation of application No. 09/929,236, filed on Aug. 13, 2001, now Pat. No. 7,610,836, said application No. 12/806,829 is a continuation of application No. 11/811,719, filed on Jun. 11, 2007, now Pat. No. 7,832,314, which is a continuation of application No. 11/061,162, filed on Feb. 18, 2015, now Pat. No. 7,228,772, which is a continuation of application No. 09/929,244, filed on Aug. 13, 2001, now Pat. No. 6,857,345, said application No. 12/806,829 is a continuation of application No. 12/587,695, filed on Oct. 9, 2009, now Pat. No. 7,921,754, which is a continuation of application No. 09/929,237, filed on Aug. 13, 2001, now Pat. No. 7,600,455, said application No. 12/806,829 is a continuation of application No. 12/661,766, filed on Mar. 22, 2010, now Pat. No. 8,051,759, which is a continuation of application No. 11/810,196, filed on Jun. 4, 2007, now Pat. No. 7,681,479, which is a continuation of application No. 09/929,234, filed on Aug. 13, 2001, now Pat. No. 7,225,712, said application No. 12/806,829 is a continuation of application No. 12/655,694, filed on Jan. 4, 2010, now Pat. No. 7,908,950, which is a continuation of application No. 12/079,836, filed on Mar. 27, 2008, now Pat. No. 7,640,837, which is a continuation of application No. 09/929,235, filed on Aug. 13, 2001, now Pat. No. 7,350,444, said application No. 12/806,829 is a continuation of application No. 12/799,211, filed on Apr. 19, 2010, now Pat. No. 8,100,039, which is a continuation of application No. 12/220,946, filed on Jul. 29, 2008, now Pat. No. 7,698,976, which is a continuation of application No. 09/929,238, filed on Aug. 13, 2001, now abandoned, said application No. 12/806,829 is a continuation of application No. 12/590,924, filed on Nov. 16, 2009, now Pat. No. 8,186,255, which is a continuation of application No. 12/154,675, filed on May 23, 2008, now Pat. No. 7,617,752, which is a continuation of application No. 10/053,390, filed on Jan. 16, 2002, now Pat. No. 7,377,199, which is a continuation-in-part of application No. 09/676,190, filed on Sep. 29, 2000, now Pat. No. 7,055,417, said application No. 12/806,829 is a continuation of application No. 12/313,162, filed on Nov. 17, 2008, now Pat. No. 7,789,002, which is a continuation of application No. 11/348,580, filed on Feb. 6, 2006, now abandoned, which is a continuation of application No. 10/052,705, filed on Jan. 16, 2002, now Pat. No. 6,994,004, said application No. 12/313,162 is a continuation of application No. 11/098,984, filed on Apr. 4, 2005, now Pat. No. 7,353,737, which is a continuation of application No. 09/929,238, filed on Aug. 13, 2001, now abandoned, said application No. 12/313,162 is a continuation of application No. 10/051,782, filed on Jan. 15, 2002, now Pat. No.

6,877,410, said application No. 12/806,829 is a continuation of application No. 12/661,993, filed on Mar. 26, 2010, now Pat. No. 8,061,246, which is a continuation of application No. 11/982,972, filed on Nov. 5, 2007, now Pat. No. 7,685,912, which is a continuation of application No. 10/932,339, filed on Sep. 1, 2004, now Pat. No. 7,290,472, which is a continuation of application No. 10/047,066, filed on Jan. 14, 2002, now Pat. No. 6,945,148, said application No. 10/932,339 is a continuation of application No. 10/050,085, filed on Jan. 14, 2002, now abandoned, said application No. 12/806,829 is a continuation of application No. 10/100,211, filed on Mar. 13, 2002, now Pat. No. 9,724,840, said application No. 12/806,829 is a continuation of application No. 11/256,757, filed on Oct. 24, 2005, now Pat. No. 8,065,943, which is a continuation of application No. 09/955,418, filed on Sep. 17, 2001, now Pat. No. 6,957,601, said application No. 12/806,829 is a continuation of application No. 10/146,527, filed on May 15, 2002, said application No. 12/806,829 is a continuation of application No. 12/586,469, filed on Sep. 21, 2009, now abandoned, which is a division of application No. 11/702,330, filed on Feb. 5, 2007, now Pat. No. 7,591,210, which is a continuation of application No. 10/189,031, filed on Jul. 2, 2002, now Pat. No. 7,171,879, said application No. 12/806,829 is a continuation of application No. 11/208,214, filed on Aug. 19, 2005, now Pat. No. 7,784,507, which is a continuation of application No. 10/251,576, filed on Sep. 20, 2002, now abandoned, which is a continuation-in-part of application No. 10/197,975, filed on Jul. 18, 2002, now abandoned, said application No. 11/208, 214 is a continuation of application No. 09/676,190, filed on Sep. 29, 2000, now Pat. No. 7,055,417, said application No. 12/806,829 is a continuation of application No. 12/231,080, filed on Aug. 29, 2008, now Pat. No. 7,900,541, which is a continuation of application No. 11/487,717, filed on Jul. 17, 2006, now Pat. No. 7,421,315, which is a continuation of application No. 10/292,607, filed on Nov. 12, 2002, now Pat. No. 7,077,039, said application No. 12/806,829 is a continuation of application No. 12/655,962, filed on Jan. 11, 2010, now abandoned, which is a continuation of application No. 12/313,277, filed on Nov. 17, 2008, now Pat. No. 7,644,645, which is a continuation of application No. 10/345,630, filed on Jan. 15, 2003, now abandoned, said application No. 12/806, 829 is a continuation of application No. 12/658,759, filed on Feb. 12, 2010, now abandoned, which is a continuation of application No. 11/787,471, filed on Apr. 17, 2007, now Pat. No. 7,661,343, which is a continuation of application No. 10/341,260, filed on Jan. 13, 2003, now abandoned, said application No. 12/806,829 is a continuation of application No. 11/647,676, filed on Dec. 29, 2006, now Pat. No. 7,836,804, which is a continuation-in-part of application No. 10/923,290, filed on Aug. 20, 2004, now Pat. No. 7,472,634, said application No. 12/806,829 is a continuation of application No. 12/079,820, filed on Mar. 27, 2008, now Pat. No. 7,845,258, which is a division of application No. 10/923,273, filed on Aug. 20, 2004, now Pat. No. 7,350,445, said application No. 12/806,829 is a continuation of application No. 12/454,569, filed on May 18, 2009, now Pat. No. 7,991,503, which is a continuation of application No. 11/027,600, filed on Dec. 31, 2004, now Pat. No. 7,536,238, said application No. 12/806,829 is a continuation of application No. 12/799,915, filed on May 3, 2010, now Pat. No. 8,087,438, which is a continuation of application No. 12/322,069, filed on Jan. 26, 2009, now Pat. No. 7,707,918, which is a continuation of application No. 11/107,499, filed on Apr. 15, 2005, now Pat. No. 7,481,140, said application No. 12/806,829 is a continuation of application No. 12/077,576, filed on Mar. 19, 2008, now abandoned, which is a continuation of application No. 11/027, 254, filed on Dec. 31, 2004, now abandoned, said application No. 12/806,829 is a continuation of application No. 12/799,920, filed on May 3, 2010, now Pat. No. 8,122,807, which is a continuation of application No. 11/026,114, filed on Dec. 31, 2004, now Pat. No. 7,707,920, said application No. 12/806,829 is a continuation of application No. 11/026,006, filed on Dec. 31, 2004, now Pat. No. 8,459,157, said application No. 12/806,829 is a continuation of application No. 11/045,972, filed on Jan. 28, 2005, now Pat. No. 7,827,890, said application No. 12/806,829 is a continuation of application No. 12/454,730, filed on May 20, 2009, now Pat. No. 7,997,176, which is a continuation of application No. 11/395,502, filed on Mar. 31, 2006, now abandoned, said application No. 12/313,162 is a continuation of application No. 10/047,066, filed on Jan. 14, 2002, now Pat. No. 6,945,148.

(60) Provisional application No. 60/225,200, filed on Aug. 14, 2000, provisional application No. 60/225,211, filed on Aug. 14, 2000, provisional application No. 60/225,170, filed on Aug. 14, 2000, provisional application No. 60/225,056, filed on Aug. 14, 2000, provisional application No. 60/225,169, filed on Aug. 14, 2000, provisional application No. 60/225,210, filed on Aug. 14, 2000, provisional application No. 60/298,207, filed on Jun. 13, 2001, provisional application No. 60/302,916, filed on Jul. 3, 2001, provisional application No. 60/324,729, filed on Sep. 24, 2001, provisional application No. 60/406,138, filed on Aug. 27, 2002, provisional application No. 60/452,159, filed on Mar. 5, 2003, provisional application No. 60/225,206, filed on Aug. 14, 2000, provisional application No. 60/225,089, filed on Aug. 14, 2000, provisional application No. 60/279,313, filed on Mar. 27, 2001, provisional application No. 60/270,942, filed on Feb. 22, 2001, provisional application No. 60/307,756, filed on Jul. 25, 2001, provisional application No. 60/308,492, filed on Jul. 27, 2001, provisional application No. 60/312,141, filed on Aug. 13, 2001, provisional application No. 60/533,598, filed on Dec. 31, 2003, provisional application No. 60/496,568, filed on Aug. 20, 2003, provisional application No. 60/225,201, filed on Aug. 14, 2000, provisional application No. 60/225,212, filed on Aug. 14, 2000, provisional application No. 60/225,059, filed on Aug. 14, 2000, provisional application No. 60/225,094, filed on Aug. 14, 2000, provisional application No. 60/225,058, filed on Aug. 14, 2000, provisional application No. 60/225,057, filed on Aug. 14, 2000, provisional application No. 60/270,011, filed on Feb. 20, 2001, provisional application No. 60/270,941, filed on Feb. 22, 2001, provisional application No. 60/273,177, filed on Mar. 2, 2001, provisional application No. 60/273,178, filed on Mar. 2, 2001, provisional application No. 60/273,902, filed on Mar. 6, 2001, provisional application No. 60/275,583, filed on Mar. 13, 2001, provisional application No. 60/233,459, filed on Sep. 18, 2000, provisional application No. 60/275,594, filed on Mar. 13, 2001, provisional application No. 60/275,595, filed on Mar. 13, 2001, provisional application No. 60/279,313, filed on Mar. 27, 2001, provisional application No. 60/292,081, filed on May 17, 2001, provisional application No. 60/292,100, filed on May 17, 2001, provisional application No. 60/298,207, filed on Jun. 13, 2001, provisional application No. 60/302,937, filed on Jul. 2, 2001, provisional application No. 60/302,916, filed on Jul. 3, 2001, provisional application No. 60/306,202, filed on Jul. 18, 2001, provisional application No. 60/307,756, filed on Jul. 25, 2001, provisional application No. 60/308,492, filed on Jul. 27, 2001, provisional application No. 60/312,141, filed on Aug. 13, 2001, provisional application No. 60/323,975, filed on Sep. 21, 2001, provisional application No. 60/157,340, filed on Oct. 1, 1999, provisional application No. 60/182,866, filed on Feb. 16, 2000, provisional application No. 60/335,970, filed on Nov. 13, 2001, provisional application No. 60/349,989, filed on Jan. 16, 2002, provisional application No. 60/351,797, filed on Jan. 25, 2002, provisional application No. 60/496,550, filed on Aug. 20, 2003, provisional application No. 60/496,574, filed on Aug. 20, 2003, provisional application No. 60/533,791, filed on Dec. 31, 2003, provisional application No. 60/533,852, filed on Dec. 31, 2003, provisional application No. 60/533,811, filed on Dec. 31, 2003, provisional application No. 60/533,575, filed on Dec. 31, 2003, provisional application No. 60/540,377, filed on Jan. 29, 2004, provisional application No. 60/667,485, filed on Mar. 31, 2005.

(51) Int. Cl.
*G05B 9/02* (2006.01)
*B27B 5/38* (2006.01)

(58) Field of Classification Search
USPC ......... 188/110, 189; 169/57, 59, 42, DIG. 3;
74/2; 403/2, 28; 411/2, 39, 390; 335/1,
335/242, 132; 318/362; 241/32.5;
337/239, 148, 1, 5, 10, 17, 140, 170, 190,
337/237, 401, 290, 404, 405; 218/2, 154;
307/639, 328, 115, 326, 142, 117, 126,
307/131; 451/409; 280/806; 297/480;
187/69, 77, 89, 189, 216, 166, 72.3;
340/679, 680, 686.1, 687, 686.3, 686.6;
200/50.37
See application file for complete search history.

(56) References Cited

U.S. PATENT DOCUMENTS

| | | |
|---|---|---|
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 15,262 | 1/1922 | Gurgel |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,038,810 A | 4/1936 | Tautz |
| 2,044,481 A | 6/1936 | Manley et al. |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |

(56) References Cited

U.S. PATENT DOCUMENTS

| | | |
|---|---|---|
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 2/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,007,501 A | 11/1961 | Mundell et al. |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,213,731 A | 10/1965 | Renard |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,274,876 A | 9/1966 | Debus |
| 3,276,497 A | 10/1966 | Heer |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |
| 3,337,008 A | 8/1967 | Trachte |
| 3,356,111 A | 12/1967 | Mitchell |
| 3,368,596 A | 2/1968 | Comer |
| 3,386,322 A | 6/1968 | Stone et al. |
| 3,439,183 A | 4/1969 | Hurst, Jr. |
| 3,445,835 A | 5/1969 | Fudaley |
| 3,454,286 A | 7/1969 | Anderson et al. |
| 3,456,696 A | 7/1969 | Gregory et al. |
| 3,512,440 A | 5/1970 | Frydmann |
| 3,538,964 A | 11/1970 | Warrick et al. |
| 3,540,338 A | 11/1970 | McEwan et al. |
| 3,547,232 A * | 12/1970 | Fergie .............. F16D 49/00 188/110 |
| 3,554,067 A | 1/1971 | Scutella |
| 3,566,934 A | 3/1971 | Thrasher |
| 3,566,996 A | 3/1971 | Crossman |
| 3,580,376 A | 5/1971 | Loshbough |
| 3,581,784 A | 6/1971 | Warrick |
| 3,593,266 A | 7/1971 | Van Sickle |
| 3,613,748 A | 10/1971 | De Pue |
| 3,621,894 A | 11/1971 | Niksich |
| 3,648,126 A | 3/1972 | Boos et al. |
| 3,670,788 A | 6/1972 | Pollak et al. |
| 3,675,444 A | 7/1972 | Whipple |
| 3,680,609 A | 8/1972 | Menge |
| 3,688,815 A | 9/1972 | Ridenour |
| 3,695,116 A | 10/1972 | Baur |
| 3,696,844 A | 10/1972 | Bernatschek |
| 3,716,113 A | 2/1973 | Kobayashi et al. |
| 3,719,103 A | 3/1973 | Streander |
| 3,740,000 A | 6/1973 | Takada |
| 3,745,546 A | 7/1973 | Struger et al. |
| 3,749,933 A | 7/1973 | Davidson |
| 3,754,493 A | 8/1973 | Niehaus et al. |
| 3,772,590 A | 11/1973 | Mikulecky et al. |
| 3,785,230 A | 1/1974 | Lokey |
| 3,793,915 A | 2/1974 | Huier |
| 3,805,639 A | 4/1974 | Peter |
| 3,805,658 A | 4/1974 | Scott et al. |
| 3,808,932 A | 5/1974 | Russell |
| 3,829,850 A | 8/1974 | Guetersloh |
| 3,829,970 A | 8/1974 | Anderson |
| 3,858,095 A | 12/1974 | Friemann et al. |
| 3,861,016 A | 1/1975 | Johnson et al. |
| 3,863,208 A | 1/1975 | Balban |
| 3,874,747 A | 4/1975 | Case et al. |
| 3,880,032 A | 4/1975 | Green |
| 3,882,744 A | 5/1975 | McCarroll |
| 3,886,413 A | 5/1975 | Dow et al. |
| 3,889,567 A | 6/1975 | Sato et al. |
| 3,905,263 A | 9/1975 | Smith |
| 3,922,785 A | 12/1975 | Fushiya |
| 3,924,688 A | 12/1975 | Cooper et al. |
| 3,931,727 A | 1/1976 | Luenser |
| 3,935,777 A | 2/1976 | Bassett |
| 3,945,286 A | 3/1976 | Smith |
| 3,946,631 A | 3/1976 | Malm |
| 3,947,734 A | 3/1976 | Flyer |
| 3,949,636 A | 4/1976 | Ball et al. |
| 3,953,770 A | 4/1976 | Hayashi |
| 3,960,310 A | 6/1976 | Nussbaum |
| 3,967,161 A | 6/1976 | Lichtblau |
| 3,970,178 A | 7/1976 | Densow |
| 3,974,565 A | 8/1976 | Ellis |
| 3,975,600 A | 8/1976 | Marston |
| 3,978,624 A | 9/1976 | Merkel et al. |
| 3,994,192 A | 11/1976 | Faig |

(56) References Cited

U.S. PATENT DOCUMENTS

| | | |
|---|---|---|
| 4,007,679 A | 2/1977 | Edwards |
| 4,016,490 A | 4/1977 | Weckenmann et al. |
| 4,026,174 A | 5/1977 | Fierro |
| 4,026,177 A | 5/1977 | Lokey |
| 4,029,159 A | 6/1977 | Nymann |
| 4,033,218 A * | 7/1977 | Donatelle .............. B23Q 11/00 83/DIG. 1 |
| 4,047,156 A | 9/1977 | Atkins |
| 4,048,886 A | 9/1977 | Zettler |
| 4,060,160 A | 11/1977 | Lieber |
| 4,063,777 A | 12/1977 | Takada |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,106,378 A | 8/1978 | Kaiser |
| 4,117,752 A | 10/1978 | Yoneda |
| 4,119,864 A * | 10/1978 | Petrizio .................... G05F 1/66 361/181 |
| 4,138,905 A | 2/1979 | Konishi |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,184,394 A | 1/1980 | Gjerde |
| 4,190,000 A | 2/1980 | Shaull et al. |
| 4,195,722 A | 4/1980 | Anderson et al. |
| 4,199,930 A | 4/1980 | Lebet et al. |
| 4,200,002 A | 4/1980 | Takahashi |
| 4,206,666 A | 6/1980 | Ashton |
| 4,206,910 A | 6/1980 | Biesemeyer |
| 4,249,117 A | 2/1981 | Leukhardt et al. |
| 4,249,442 A | 2/1981 | Fittery |
| 4,251,599 A | 2/1981 | McCormick |
| 4,255,995 A | 3/1981 | Connor |
| 4,262,278 A | 4/1981 | Howard et al. |
| 4,267,914 A | 5/1981 | Saar |
| 4,270,427 A | 6/1981 | Colberg et al. |
| 4,276,459 A | 6/1981 | Willett et al. |
| 4,276,799 A | 7/1981 | Muehling |
| 4,288,048 A | 9/1981 | Sieben |
| 4,291,794 A | 9/1981 | Bauer |
| 4,302,879 A | 12/1981 | Murray |
| 4,305,442 A | 12/1981 | Currie |
| 4,319,146 A | 3/1982 | Wires, Sr. |
| 4,321,841 A | 3/1982 | Felix |
| 4,334,450 A | 6/1982 | Benuzzi |
| 4,370,810 A | 2/1983 | Schurr et al. |
| 4,372,202 A | 2/1983 | Cameron |
| 4,374,552 A | 2/1983 | Dayen |
| 4,385,539 A | 5/1983 | Meyerhoefer et al. |
| 4,391,358 A | 7/1983 | Haeger |
| 4,418,597 A | 12/1983 | Krusemark et al. |
| 4,427,042 A | 1/1984 | Mitchell et al. |
| 4,466,170 A | 8/1984 | Davis |
| 4,466,233 A | 8/1984 | Thesman |
| 4,470,046 A | 9/1984 | Betsill |
| 4,492,291 A | 1/1985 | Chometon et al. |
| 4,503,739 A | 3/1985 | Konieczka |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,557,168 A | 12/1985 | Tokiwa |
| 4,559,858 A | 12/1985 | Laskowski et al. |
| 4,560,033 A | 12/1985 | DeWoody et al. |
| 4,566,512 A | 1/1986 | Wilson |
| 4,573,556 A | 3/1986 | Andreasson |
| 4,576,073 A | 3/1986 | Stinson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,615,247 A | 10/1986 | Berkeley |
| 4,617,544 A | 10/1986 | Mooz et al. |
| 4,621,300 A | 11/1986 | Summerer |
| 4,625,406 A | 12/1986 | Fushiya et al. |
| 4,625,604 A | 12/1986 | Handler et al. |
| 4,635,364 A | 1/1987 | Noll et al. |
| 4,637,188 A | 1/1987 | Crothers |
| 4,637,289 A | 1/1987 | Ramsden |
| 4,638,393 A | 1/1987 | Oishi et al. |
| 4,644,832 A | 2/1987 | Smith |
| 4,653,189 A | 3/1987 | Andreasson |
| 4,657,428 A | 4/1987 | Wiley |
| 4,661,797 A | 4/1987 | Schmall |
| 4,672,500 A | 6/1987 | Tholome et al. |
| 4,675,664 A | 6/1987 | Cloutier et al. |
| 4,679,719 A | 7/1987 | Kramer |
| 4,683,660 A | 8/1987 | Schurr |
| 4,694,721 A | 9/1987 | Brickner, Jr. |
| 4,718,229 A | 1/1988 | Riley |
| 4,721,023 A | 1/1988 | Bartlett et al. |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,774,866 A | 10/1988 | Dehari et al. |
| 4,792,965 A | 12/1988 | Morgan |
| 4,805,504 A | 2/1989 | Fushiya et al. |
| 4,805,505 A | 2/1989 | Cantlin |
| 4,819,501 A | 4/1989 | Kraus et al. |
| 4,831,279 A | 5/1989 | Ingraham |
| 4,840,135 A | 6/1989 | Yamauchi |
| 4,845,476 A | 7/1989 | Rangeard et al. |
| 4,864,455 A | 9/1989 | Shimomura et al. |
| 4,875,398 A | 10/1989 | Taylor et al. |
| 4,888,869 A | 12/1989 | Leatherman |
| 4,896,607 A | 1/1990 | Hall et al. |
| 4,906,962 A | 3/1990 | Duimstra |
| 4,907,679 A | 3/1990 | Menke |
| 4,934,233 A | 6/1990 | Brundage et al. |
| 4,936,876 A | 6/1990 | Reyes |
| 4,937,554 A | 6/1990 | Herman |
| 4,962,685 A | 10/1990 | Hagstrom |
| 4,964,450 A | 10/1990 | Hughes et al. |
| 4,965,909 A | 10/1990 | McCullough et al. |
| 4,969,063 A * | 11/1990 | Scott ..................... H01H 73/14 200/310 |
| 4,975,798 A | 12/1990 | Edwards et al. |
| 5,020,406 A | 6/1991 | Sasaki et al. |
| 5,025,175 A | 6/1991 | Dubois, III |
| 5,042,348 A | 8/1991 | Brundage et al. |
| 5,046,426 A | 9/1991 | Julien et al. |
| 5,052,255 A | 10/1991 | Gaines |
| 5,067,366 A | 11/1991 | Gandiglio |
| 5,074,047 A | 12/1991 | King |
| 5,081,406 A | 1/1992 | Hughes et al. |
| 5,082,316 A | 1/1992 | Wardlaw |
| 5,083,973 A | 1/1992 | Townsend |
| 5,086,890 A | 2/1992 | Turczyn et al. |
| 5,094,000 A | 3/1992 | Becht et al. |
| 5,116,249 A | 5/1992 | Shiotani et al. |
| 5,119,555 A | 6/1992 | Johnson |
| 5,122,091 A | 6/1992 | Townsend |
| 5,123,317 A | 6/1992 | Barnes, Jr. et al. |
| 5,125,160 A | 6/1992 | Gassen |
| 5,146,714 A | 9/1992 | Liiber |
| 5,156,508 A | 10/1992 | Grisley |
| 5,174,349 A | 12/1992 | Svetlik et al. |
| 5,184,403 A | 2/1993 | Schliemann |
| 5,184,534 A | 2/1993 | Lee |
| 5,198,702 A | 3/1993 | McCullough et al. |
| 5,199,343 A | 4/1993 | OBanion |
| 5,201,110 A | 4/1993 | Bane |
| 5,201,684 A | 4/1993 | DeBois, III |
| 5,201,863 A | 4/1993 | Peot |
| 5,205,069 A * | 4/1993 | Shapiro ..................... B01J 3/03 49/141 |
| 5,206,625 A | 4/1993 | Davis |

(56) References Cited

U.S. PATENT DOCUMENTS

| | | | |
|---|---|---|---|
| 5,207,253 A | 5/1993 | Hoshino et al. |
| 5,212,621 A | 5/1993 | Panter |
| 5,218,189 A | 6/1993 | Hutchison |
| 5,230,269 A | 7/1993 | Shiotani et al. |
| 5,231,359 A | 7/1993 | Masuda et al. |
| 5,231,906 A | 8/1993 | Kogej |
| 5,239,879 A | 8/1993 | Plangetis |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A | 2/1994 | Bosten et al. |
| 5,293,802 A | 3/1994 | Shiontani et al. |
| 5,320,382 A | 6/1994 | Goldstein et al. |
| 5,321,230 A | 6/1994 | Shanklin et al. |
| 5,331,875 A | 7/1994 | Mayfield |
| 5,353,670 A | 10/1994 | Metzger, Jr. |
| 5,377,554 A | 1/1995 | Reulein et al. |
| 5,377,571 A | 1/1995 | Josephs |
| 5,392,568 A | 2/1995 | Howard, Jr. et al. |
| 5,392,678 A | 2/1995 | Sasaki et al. |
| 5,401,928 A | 3/1995 | Kelley |
| 5,411,221 A | 5/1995 | Collins et al. |
| 5,423,232 A | 6/1995 | Miller et al. |
| 5,436,613 A | 7/1995 | Ghosh et al. |
| 5,447,085 A | 9/1995 | Gochnauer |
| 5,451,750 A | 9/1995 | An |
| 5,453,903 A | 9/1995 | Chow |
| 5,471,888 A | 12/1995 | McCormick |
| 5,480,009 A | 1/1996 | Wieland et al. |
| 5,503,059 A | 4/1996 | Pacholok |
| 5,510,587 A | 4/1996 | Reiter |
| 5,510,685 A | 4/1996 | Grasselli |
| 5,513,548 A | 5/1996 | Garuglieri |
| 5,531,147 A | 7/1996 | Serban |
| 5,534,836 A | 7/1996 | Schenkel et al. |
| 5,572,916 A | 11/1996 | Takano |
| 5,587,618 A | 12/1996 | Hathaway |
| 5,592,353 A | 1/1997 | Shinohara et al. |
| 5,606,889 A | 3/1997 | Bielinski et al. |
| 5,619,896 A | 4/1997 | Chen |
| 5,623,860 A | 4/1997 | Schoene et al. |
| 5,647,258 A | 7/1997 | Brazell et al. |
| 5,648,644 A | 7/1997 | Nagel |
| 5,659,454 A | 8/1997 | Vermesse |
| 5,667,152 A | 9/1997 | Mooring |
| 5,671,633 A | 9/1997 | Wagner |
| 5,695,306 A | 12/1997 | Nygren, Jr. |
| 5,700,165 A | 12/1997 | Harris et al. |
| 5,720,213 A | 2/1998 | Sberveglieri |
| 5,722,308 A | 3/1998 | Ceroll et al. |
| 5,724,875 A | 3/1998 | Meredith et al. |
| 5,730,165 A | 3/1998 | Philipp |
| 5,741,048 A | 4/1998 | Eccleston |
| 5,755,148 A | 5/1998 | Stumpf et al. |
| 5,768,786 A | 6/1998 | Kane et al. |
| 5,771,742 A | 6/1998 | Bokaie et al. |
| 5,782,001 A | 7/1998 | Gray |
| 5,787,779 A | 8/1998 | Garuglieri |
| 5,791,057 A | 8/1998 | Nakamura et al. |
| 5,791,223 A | 8/1998 | Lanzer |
| 5,791,224 A | 8/1998 | Suzuki et al. |
| 5,791,441 A | 8/1998 | Matos et al. |
| 5,797,307 A | 8/1998 | Horton |
| 5,819,619 A | 10/1998 | Miller et al. |
| 5,819,625 A | 10/1998 | Sberveglieri |
| 5,852,951 A | 12/1998 | Santi |
| 5,857,507 A | 1/1999 | Puzio et al. |
| 5,861,809 A | 1/1999 | Eckstein et al. |
| 5,875,698 A | 3/1999 | Ceroll et al. |
| 5,880,954 A | 3/1999 | Thomson et al. |
| 5,921,367 A | 7/1999 | Kashioka et al. |
| 5,927,857 A | 7/1999 | Ceroll et al. |
| 5,930,096 A | 7/1999 | Kim |
| 5,937,720 A | 8/1999 | Itzov |
| 5,938,172 A * | 8/1999 | Ohtsuka ............... H01F 7/1844 361/156 |
| 5,942,975 A | 8/1999 | Sorensen |
| 5,943,932 A | 8/1999 | Sberveglieri |
| 5,950,514 A | 9/1999 | Benedict et al. |
| 5,963,173 A | 10/1999 | Lian et al. |
| 5,974,927 A | 11/1999 | Tsune |
| 5,989,116 A | 11/1999 | Johnson et al. |
| 6,009,782 A | 1/2000 | Tajima et al. |
| 6,018,284 A | 1/2000 | Rival et al. |
| 6,037,729 A | 3/2000 | Woods et al. |
| D422,290 S | 4/2000 | Welsh et al. |
| 6,052,884 A | 4/2000 | Steckler et al. |
| 6,062,121 A | 5/2000 | Ceroll et al. |
| 6,070,484 A | 6/2000 | Sakamaki |
| 6,095,092 A | 8/2000 | Chou |
| 6,109,157 A | 8/2000 | Talesky |
| 6,112,785 A | 9/2000 | Yu |
| 6,119,984 A | 9/2000 | Devine |
| 6,131,629 A | 10/2000 | Puzio et al. |
| 6,133,818 A | 10/2000 | Shieh et al. |
| 6,141,192 A | 10/2000 | Garzon |
| 6,148,504 A | 11/2000 | Schmidt et al. |
| 6,148,526 A | 11/2000 | Kirn et al. |
| 6,148,703 A | 11/2000 | Ceroll et al. |
| 6,150,826 A | 11/2000 | Hokodate et al. |
| 6,161,459 A | 12/2000 | Ceroll et al. |
| 6,170,370 B1 | 1/2001 | Sommerville |
| 6,244,149 B1 | 6/2001 | Ceroll et al. |
| 6,250,190 B1 | 6/2001 | Ceroll et al. |
| 6,257,061 B1 | 7/2001 | Nonoyama et al. |
| 6,283,002 B1 | 9/2001 | Chiang |
| 6,295,910 B1 | 10/2001 | Childs et al. |
| 6,312,028 B1 | 11/2001 | Wilkosz |
| 6,325,195 B1 | 12/2001 | Doherty |
| 6,330,848 B1 | 12/2001 | Nishio et al. |
| 6,336,273 B1 | 1/2002 | Nilsson et al. |
| 6,352,137 B1 | 3/2002 | Stegall et al. |
| 6,357,328 B1 | 3/2002 | Ceroll et al. |
| 6,361,092 B1 | 3/2002 | Eagle et al. |
| 6,366,099 B1 | 4/2002 | Reddi |
| 6,376,939 B1 | 4/2002 | Suzuki et al. |
| 6,404,098 B1 | 6/2002 | Kayama et al. |
| 6,405,624 B2 | 6/2002 | Sutton |
| 6,418,829 B1 | 7/2002 | Pilchowski |
| 6,420,814 B1 | 7/2002 | Bobbio |
| 6,427,570 B1 | 8/2002 | Miller et al. |
| 6,430,007 B1 | 8/2002 | Jabbari |
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,471,106 B1 | 10/2002 | Reining |
| 6,479,958 B1 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,530,303 B1 | 3/2003 | Parks et al. |
| 6,536,536 B1 | 3/2003 | Gass et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,627,829 B2 * | 9/2003 | Sato ..................... H01H 9/181 200/310 |
| 6,640,683 B2 | 11/2003 | Lee |

(56) References Cited

U.S. PATENT DOCUMENTS

| | | | |
|---|---|---|---|
| 6,644,157 B2 | 11/2003 | Huang | |
| 6,647,847 B2 | 11/2003 | Hewitt et al. | |
| 6,659,233 B2 | 12/2003 | DeVlieg | |
| 6,684,750 B2 | 2/2004 | Yu | |
| 6,722,242 B2 | 4/2004 | Chuang | |
| 6,734,581 B1 | 5/2004 | Griffis | |
| 6,736,042 B2 | 5/2004 | Behne et al. | |
| 6,742,430 B2 | 6/2004 | Chen | |
| 6,796,208 B1 | 9/2004 | Jorgensen | |
| 6,800,819 B2 | 10/2004 | Sato et al. | |
| 6,826,988 B2 | 12/2004 | Gass et al. | |
| 6,826,992 B1 | 12/2004 | Huang | |
| 6,840,144 B2 | 1/2005 | Huang | |
| 6,854,371 B2 | 2/2005 | Yu | |
| 6,857,345 B2 | 2/2005 | Gass et al. | |
| 6,874,397 B2 | 4/2005 | Chang | |
| 6,874,399 B2 | 4/2005 | Lee | |
| 6,877,410 B2 | 4/2005 | Gass et al. | |
| 6,880,440 B2 | 4/2005 | Gass et al. | |
| 6,883,397 B2 | 4/2005 | Kimizuka | |
| 6,889,585 B1 | 5/2005 | Harris et al. | |
| 6,920,814 B2 | 7/2005 | Gass et al. | |
| 6,922,153 B2 | 7/2005 | Pierga et al. | |
| 6,945,148 B2 | 9/2005 | Gass et al. | |
| 6,945,149 B2 | 9/2005 | Gass et al. | |
| 6,957,601 B2 | 10/2005 | Gass et al. | |
| 6,968,767 B2 | 11/2005 | Yu | |
| 6,986,370 B1 | 1/2006 | Schoene et al. | |
| 6,994,004 B2 | 2/2006 | Gass et al. | |
| 6,997,090 B2 | 2/2006 | Gass et al. | |
| 7,000,514 B2 | 2/2006 | Gass et al. | |
| 7,024,975 B2 | 4/2006 | Gass et al. | |
| 7,055,417 B1 | 6/2006 | Gass et al. | |
| 7,077,039 B2 | 7/2006 | Gass et al. | |
| 7,098,800 B2 | 8/2006 | Gass | |
| 7,100,483 B2 | 9/2006 | Gass et al. | |
| 7,137,326 B2 | 11/2006 | Gass et al. | |
| 7,171,879 B2 | 2/2007 | Gass et al. | |
| 7,197,969 B2 | 4/2007 | Gass et al. | |
| 7,210,383 B2 | 5/2007 | Gass et al. | |
| 7,225,712 B2 * | 6/2007 | Gass | B23D 47/08 83/DIG. 1 |
| 7,228,772 B2 | 6/2007 | Gass | |
| 7,231,856 B2 | 6/2007 | Gass et al. | |
| 7,400,239 B2 * | 7/2008 | Kiko | H01H 9/161 200/1 R |
| 7,525,055 B2 * | 4/2009 | Gass | B23D 59/001 200/50.37 |
| 7,600,455 B2 * | 10/2009 | Gass | B23D 59/001 83/DIG. 1 |
| 7,707,920 B2 * | 5/2010 | Gass | B23D 45/067 83/471.1 |
| 7,788,999 B2 * | 9/2010 | Gass | B23D 59/001 83/DIG. 1 |
| 7,895,927 B2 * | 3/2011 | Gass | B23D 47/08 83/DIG. 1 |
| 8,011,279 B2 * | 9/2011 | Gass | B23D 59/001 83/62.1 |
| 8,432,292 B2 * | 4/2013 | Visel | B23D 59/001 340/573.1 |
| 8,494,663 B2 * | 7/2013 | Lamoree | B64D 11/003 200/17 R |
| 8,587,147 B2 * | 11/2013 | DiLuciano | H02H 7/0816 307/10.1 |
| 9,261,234 B2 * | 2/2016 | DiLuciano | B60L 3/0092 307/328 |
| 9,522,476 B2 * | 12/2016 | Gass | B26D 7/24 83/62.1 |
| 2002/0017175 A1 | 2/2002 | Gass et al. | |
| 2002/0017176 A1 | 2/2002 | Gass et al. | |
| 2002/0017178 A1 | 2/2002 | Gass et al. | |
| 2002/0017179 A1 | 2/2002 | Gass et al. | |
| 2002/0017180 A1 | 2/2002 | Gass et al. | |
| 2002/0017181 A1 | 2/2002 | Gass et al. | |
| 2002/0017182 A1 | 2/2002 | Gass et al. | |
| 2002/0017184 A1 | 2/2002 | Gass et al. | |
| 2002/0017336 A1 | 2/2002 | Gass et al. | |
| 2002/0020261 A1 | 2/2002 | Gass et al. | |
| 2002/0020262 A1 | 2/2002 | Gass et al. | |
| 2002/0020263 A1 | 2/2002 | Gass et al. | |
| 2002/0020271 A1 | 2/2002 | Gass et al. | |
| 2002/0043776 A1 | 4/2002 | Chuang | |
| 2002/0050201 A1 | 5/2002 | Lane et al. | |
| 2002/0050714 A1 * | 5/2002 | Imai | B42D 25/29 283/74 |
| 2002/0056349 A1 | 5/2002 | Gass et al. | |
| 2002/0059853 A1 | 5/2002 | Gass et al. | |
| 2002/0059854 A1 | 5/2002 | Gass et al. | |
| 2002/0069734 A1 | 6/2002 | Gass et al. | |
| 2002/0088325 A1 | 7/2002 | Talesky et al. | |
| 2002/0096030 A1 | 7/2002 | Wang | |
| 2002/0096591 A1 | 7/2002 | Tanji | |
| 2002/0109036 A1 | 8/2002 | Denen et al. | |
| 2002/0134212 A1 | 9/2002 | Ceroll et al. | |
| 2002/0170399 A1 | 11/2002 | Gass et al. | |
| 2002/0170400 A1 | 11/2002 | Gass | |
| 2002/0174755 A1 | 11/2002 | Behne et al. | |
| 2002/0190581 A1 | 12/2002 | Gass et al. | |
| 2003/0000359 A1 | 1/2003 | Eccardt et al. | |
| 2003/0002942 A1 | 1/2003 | Gass et al. | |
| 2003/0005588 A1 | 1/2003 | Gass et al. | |
| 2003/0015253 A1 | 1/2003 | Gass et al. | |
| 2003/0037651 A1 | 2/2003 | Gass et al. | |
| 2003/0037655 A1 | 2/2003 | Chin-Chin | |
| 2003/0056853 A1 | 3/2003 | Gass et al. | |
| 2003/0058121 A1 | 3/2003 | Gass et al. | |
| 2003/0074873 A1 | 4/2003 | Freiberg et al. | |
| 2003/0089212 A1 | 5/2003 | Parks et al. | |
| 2003/0090224 A1 | 5/2003 | Gass et al. | |
| 2003/0101857 A1 | 6/2003 | Chuang | |
| 2003/0109798 A1 | 6/2003 | Kermani | |
| 2003/0131703 A1 | 7/2003 | Gass et al. | |
| 2003/0140749 A1 | 7/2003 | Gass et al. | |
| 2003/0213349 A1 | 11/2003 | Chang | |
| 2004/0011177 A1 | 1/2004 | Huang | |
| 2004/0040426 A1 | 3/2004 | Gass et al. | |
| 2004/0060404 A1 | 4/2004 | Metzger, Jr. | |
| 2004/0103544 A1 | 6/2004 | Hartmann | |
| 2004/0104085 A1 | 6/2004 | Lang et al. | |
| 2004/0118261 A1 | 6/2004 | Garcia et al. | |
| 2004/0159198 A1 | 8/2004 | Peot et al. | |
| 2004/0194594 A1 | 10/2004 | Dils et al. | |
| 2004/0200329 A1 | 10/2004 | Sako | |
| 2004/0226424 A1 | 11/2004 | O'Banion et al. | |
| 2004/0226800 A1 | 11/2004 | Pierga et al. | |
| 2004/0255745 A1 | 12/2004 | Peot et al. | |
| 2005/0057206 A1 | 3/2005 | Uneyama | |
| 2005/0066784 A1 | 3/2005 | Gass | |
| 2005/0087049 A1 | 4/2005 | Miller et al. | |
| 2005/0092149 A1 | 5/2005 | Hartmann | |
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0145080 A1 | 7/2005 | Voigtlaender | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0204885 A1 | 9/2005 | Gass et al. | |
| 2005/0211034 A1 | 9/2005 | Sasaki et al. | |
| 2005/0235793 A1 | 10/2005 | O'Banion et al. | |
| 2005/0268767 A1 | 12/2005 | Pierga et al. | |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0123960 A1 | 6/2006 | Gass et al. | |
| 2006/0123964 A1 | 6/2006 | Gass et al. | |
| 2006/0179983 A1 | 8/2006 | Gass et al. | |
| 2006/0219076 A1 | 10/2006 | Gass et al. | |
| 2006/0225551 A1 | 10/2006 | Gass | |
| 2006/0230896 A1 | 10/2006 | Gass | |
| 2006/0247795 A1 | 11/2006 | Gass et al. | |

(56) References Cited

U.S. PATENT DOCUMENTS

| | | | |
|---|---|---|---|
| 2006/0254401 A1 | 11/2006 | Gass et al. | |
| 2006/0272463 A1 | 12/2006 | Gass | |
| 2007/0028733 A1 | 2/2007 | Gass | |
| 2007/0101842 A1 | 5/2007 | Gass | |
| 2010/0050843 A1* | 3/2010 | Gass | B23D 45/067 83/477.1 |
| 2011/0162946 A1* | 7/2011 | Altonen | H01H 13/023 200/33 R |
| 2013/0299325 A1* | 11/2013 | Lewicki | H01H 23/025 200/310 |
| 2015/0277431 A1* | 10/2015 | Taylor | G05B 19/4163 700/185 |
| 2015/0283630 A1* | 10/2015 | Gass | B23D 45/067 83/477.1 |
| 2016/0016240 A1* | 1/2016 | Koegel | B23D 59/001 83/76.8 |
| 2016/0031580 A1* | 2/2016 | Dugat | B23K 26/0838 83/36 |
| 2016/0121412 A1* | 5/2016 | Fulmer | B23D 45/06 83/477.2 |

FOREIGN PATENT DOCUMENTS

| | | |
|---|---|---|
| DE | 76186 | 8/1921 |
| DE | 2917497 | 4/1979 |
| DE | 2800403 | 7/1979 |
| DE | 3427733 | 1/1986 |
| DE | 4205965 C1 | 2/1992 |
| DE | 4235161 A1 | 5/1993 |
| DE | 4326313 | 2/1995 |
| DE | 19609771 | 6/1998 |
| DE | 19609771 A1 * | 6/1998 |
| DE | 20102704 | 2/2001 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |
| WO | WO 8606816 A1 * | 11/1986 |
| WO | WO 9712174 A1 * | 4/1997 |
| WO | WO 0126064 A2 * | 4/2001 |

OTHER PUBLICATIONS

Skil Model 3400-Type 1 10" Table Saw Parts List and Technical Bulletin, S-B Power Tool Company, Jun. 1993.

Shop Fox® Fence Operating Manual, Woodstock International, Inc., 1996, revised May 1997.

Gordon Engineering Corp., Product Catalog, pp. cover, 1, 3 and back, Brookfield, Connecticut, US, Oct. 1997.

Analog Devices, Inc., 3-Axis Capacitive Sensor—Preliminary Technical Data AD7103, pp. 1-40, © 1998.

U.S. Appl. No. 60/157,340, filed Oct. 1, 1999, entitled "Fast-Acting Safety Stop."

Altendorf publication, 1999.

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).

Excaliber T-Slot Precision Saw Fence Model TT45 Owner's Manual, Sommerville Design & Manufacturing, Inc., May 2000.

Biesemeyer® T-Square® Universal Home Shop Fence system Instruction Manual, Delta Machinery, Jun. 1, 2001.

Bosch Model 4000 Worksite Table Saw Operating/Safety Instructions, S-B Power Tool Company, Jul. 2000.

Two photographs of a saw displayed at a trade show on Aug. 23, 2000.

XACTA Fence II™ Homeshop 30/52 Owner's Manual, JET Equipment & Tools, Mar. 2001.

XACTA Fence II™ Commercial 30/50 Owner's Manual, JET Equipment & Tools, Mar. 2001.

Bosch 10" Table Saw Model 0601476139 Parts List and Technical Bulletin, S-B Power Tool Company, Apr. 2001.

Powermatic 10" Tilting Arbor Saw Model 66 Instruction Manual & Parts List, JET Equipment & Tools, Jun. 2001.

Skil Model 3400 Table Saw Operating/Safety Instructions, S-B Power Tool Co., Sep. 2001.

Grizzly Industrial, Inc. *Heavy-Duty 12" Table Saw Model G5959 and G9957 Parts List*, 1998 and Oct. 2001.

Tablesaw Splitters and Blade Covers, *Fine Woodworking*, pp. 77-81, Dec. 2001.

*The Merlin Splitter by Excalibur a Sommerville Design Product Overview & Generic Installation Notes*, Sommerville Design & Manu Inc., at least as early as 2002.

Craftsman® Power and Hand Tools, pp. 142-143, 2003.

INCRA Incremental Micro Precision Table Saw Fence Owner's Manual, Taylor Design Group, Inc., 2003.

Shop Fox® Models W2005, W2006, W2007 Classic Fence Instruction Manual, Woodstock International, Jan. 2000, revised Mar. 2004.

ACCU-FENCE® 64A Fence and Rail System Owner's Manual, WMH Tool Group, Sep. 2004.

Unifence™ Saw Guide Instruction Manual, Delta Machinery, Feb. 22, 2005.

Biesemeyer® T-Square® Commercial Fence System Instruction Manual, Delta Machinery, May 2, 2005.

Young Inventor: Teen's Device Earns Her Trip to Science Fair, *The Arizona Republic*, May 5, 2006.

Operator Injury Mitigation Using Electronic Sensing and Mechanical Braking and Decoupling Devices in Handheld Circular Saws, Erin F. Eppard, date unknown.

*You Should Have Invented It*, French television show video.

Laguna Tools table saw owner's manual, date unknown.

SCM Group publication, undated.

* cited by examiner

TABLE SAWS

CROSS-REFERENCE TO RELATED APPLICATION

This application is a continuation of the following U.S. patent applications, all of which are hereby incorporated by reference in their entireties:

Ser. No. 12/806,829, filed Aug. 20, 2010, which is a continuation of Ser. No. 09/929,426, filed Aug. 13, 2001, issuing as U.S. Pat. No. 7,210,383 on May 1, 2007, which claims the benefit of and priority from U.S. Provisional Patent Application Ser. No. 60/225,200, filed Aug. 14, 2000;

and Ser. No. 12/806,829 is also a continuation of Ser. No. 12/655,695, filed Jan. 4, 2010, issuing as U.S. Pat. No. 8,006,595 on Aug. 30, 2011, which is a continuation of Ser. No. 11/975,985, filed Oct. 22, 2007, issuing as U.S. Pat. No. 7,640,835 on Jan. 5, 2010, which is a continuation of Ser. No. 09/929,221, filed Aug. 13, 2001, issuing as U.S. Pat. No. 7,284,467 on Oct. 23, 2007, which claims the benefit of and priority from U.S. Provisional Patent Application Ser. No. 60/225,211, filed Aug. 14, 2000;

and Ser. No. 12/806,829 is also a continuation of Ser. No. 12/002,388 filed Dec. 17, 2007, issuing as U.S. Pat. No. 8,011,279 on Sep. 6, 2011, which is a continuation of Ser. No. 09/929,227, filed Aug. 13, 2001, issuing as U.S. Pat. No. 7,308,843 on Dec. 18, 2007, which claims the benefit of and priority from U.S. Provisional Patent Application Ser. No. 60/225,170, filed Aug. 14, 2000;

and Ser. No. 12/806,829 is also a continuation of Ser. No. 11/401,050, filed Apr. 10, 2006, issuing as U.S. Pat. No. 7,788,999 on Sep. 7, 2010, which is a continuation of Ser. No. 09/929,240, filed Aug. 13, 2001, issuing as U.S. Pat. No. 7,100,483 on Sep. 5, 2006, which claims the benefit of and priority from U.S. Provisional Patent Application Ser. No. 60/225,056, filed Aug. 14, 2000;

and Ser. No. 11/401,050 is also a continuation of Ser. No. 09/929,241, filed Aug. 13, 2001, issuing as U.S. Pat. No. 7,024,975 on Apr. 11, 2006, which claims the benefit of and priority from U.S. Provisional Patent Application Ser. No. 60/225,169, filed Aug. 14, 2000;

and Ser. No. 11/401,050 is also a continuation of Ser. No. 09/929,425, filed Aug. 13, 2001, issuing as U.S. Pat. No. 7,137,326 on Nov. 21, 2006, which claims the benefit of and priority from U.S. Provisional Patent Application Ser. No. 60/225,210, filed Aug. 14, 2000;

and Ser. No. 11/401,050 is also a continuation of Ser. No. 10/172,553, filed Jun. 13, 2002, issuing as U.S. Pat. No. 7,231,856 on Jun. 19, 2007, which claims the benefit of and priority from U.S. Provisional Patent Application Ser. No. 60/298,207, filed Jun. 13, 2001;

and Ser. No. 11/401,050 is also a continuation of Ser. No. 10/189,027, filed Jul. 2, 2002, issuing as U.S. Pat. No. 7,712,403 on May 11, 2010, which claims the benefit of and priority from U.S. Provisional Patent Application Ser. No. 60/302,916, filed Jul. 3, 2001;

and Ser. No. 11/401,050 is also a continuation of Ser. No. 10/243,042, filed Sep. 13, 2002, issuing as U.S. Pat. No. 7,197,969 on Apr. 3, 2007, which claims the benefit of and priority from U.S. Provisional Patent Application Ser. No. 60/324,729, filed Sep. 24, 2001;

and Ser. No. 11/401,050 is also a continuation of Ser. No. 10/643,296, filed Aug. 18, 2003, now abandoned, which claims the benefit of and priority from U.S. Provisional Patent Application Ser. No. 60/406,138, filed Aug. 27, 2002;

and Ser. No. 11/401,050 is also a continuation of Ser. No. 10/794,161, filed Mar. 4, 2004, issuing as U.S. Pat. No. 7,098,800 on Aug. 29, 2006, which claims the benefit of and priority from U.S. Provisional Patent Application Ser. No. 60/452,159, filed Mar. 5, 2003;

and Ser. No. 12/806,829 is also a continuation of Ser. No. 12/800,607, filed May 19, 2010, issuing as U.S. Pat. No. 7,895,927 on Mar. 1, 2011, which is a continuation of Ser. No. 11/542,938, filed Oct. 2, 2006, now abandoned, which is a continuation of Ser. No. 10/984,643, filed Nov. 8, 2004, issuing as U.S. Pat. No. 8,061,245 on Nov. 22, 2011, which is a continuation of Ser. No. 09/929,226, filed Aug. 13, 2001, issuing as U.S. Pat. No. 6,920,814 on Jul. 26, 2005, which claims the benefit of and priority from U.S. Provisional Patent Application Ser. No. 60/225,206, filed Aug. 14, 2000;

and Ser. No. 10/984,643 is also a continuation of Ser. No. 09/929,240, filed Aug. 13, 2001, issuing as U.S. Pat. No. 7,100,483 on Sep. 5, 2006, which claims the benefit of and priority from U.S. Provisional Patent Application Ser. No. 60/225,056, filed Aug. 14, 2000;

and Ser. No. 10/984,643 is also a continuation of Ser. No. 09/929,242, filed Aug. 13, 2001, issuing as U.S. Pat. No. 7,509,899 on Mar. 31, 2009, which claims the benefit of and priority from Ser. No. 60/225,089, filed Aug. 14, 2000;

and Ser. No. 10/984,643 is also a continuation of Ser. No. 10/051,782, filed Jan. 15, 2002, issuing as U.S. Pat. No. 6,877,410 on Apr. 12, 2005, which claims the benefit of and priority from U.S. Provisional Patent Application Ser. No. 60/279,313, filed Mar. 27, 2001;

and Ser. No. 10/984,643 is also a continuation of Ser. No. 10/052,806, filed Jan. 16, 2002, issuing as U.S. Pat. No. 6,880,440 on Apr. 19, 2005, which claims the benefit of and priority from U.S. Provisional Patent Application Ser. No. 60/270,942, filed Feb. 22, 2001;

and Ser. No. 10/984,643 is also a continuation of Ser. No. 10/205,164, filed Jul. 25, 2002, issuing as U.S. Pat. No. 6,945,149 on Sep. 20, 2005, which claims the benefit of and priority from U.S. Provisional Patent Application Ser. No. 60/307,756, filed Jul. 25, 2001;

and Ser. No. 10/984,643 is also a continuation of Ser. No. 10/202,928, filed Jul. 25, 2002, issuing as U.S. Pat. No. 7,000,514 on Feb. 21, 2006, which claims the benefit of and priority from U.S. Provisional Patent Application Ser. No. 60/308,492, filed Jul. 27, 2001;

and Ser. No. 10/984,643 is also a continuation of and Ser. No. 10/785,361, filed Feb. 23, 2004, issuing as U.S. Pat. No. 6,997,090 on Feb. 14, 2006, which is a continuation of Ser. No. 10/215,929, filed Aug. 9, 2002, now abandoned, which claims the benefit of and priority from U.S. Provisional Patent Application Ser. No. 60/312,141, filed Aug. 13, 2001;

and Ser. No. 11/542,938 is also a continuation of Ser. No. 11/401,774, filed Apr. 11, 2006, issuing as U.S. Pat. No. 7,525,055 on Apr. 28, 2009, which is a continuation of Ser. No. 11/027,322, filed Dec. 31, 2004, now abandoned, which claims the benefit of and priority from U.S. Provisional Patent Application Ser. No. 60/533,598, filed Dec. 31, 2003;

and Ser. No. 11/542,938 is also a continuation of Ser. No. 11/445,548, filed Jun. 2, 2006, issuing as U.S. Pat. No. 7,347,131 on Mar. 25, 2008;

and Ser. No. 11/542,938 is also a continuation of Ser. No. 11/506,260, filed Aug. 18, 2006, issuing as U.S. Pat. No. 7,359,174 on Apr. 15, 2008, which is a continuation of Ser. No. 10/923,282, filed Aug. 20, 2004, now abandoned, which claims the benefit of and priority from U.S. Provisional Patent Application Ser. No. 60/496,568, filed Aug. 20, 2003;

and Ser. No. 12/806,829 is also a continuation of Ser. No. 12/590,094, filed Nov. 2, 2009, issuing as U.S. Pat. No. 7,958,806 on Jun. 14, 2011, which is a continuation of Ser. No. 09/929,236, filed Aug. 13, 2001, issuing as U.S. Pat. No.

7,610,836 on Nov. 3, 2009, which claims the benefit of and priority from U.S. Provisional Patent Application Ser. No. 60/225,201, filed Aug. 14, 2000;

and Ser. No. 12/806,829 is also a continuation of Ser. No. 11/811,719, filed Jun. 11, 2007, issuing as U.S. Pat. No. 7,832,314 on Nov. 16, 2010, which is a continuation of Ser. No. 11/061,162, filed Feb. 18, 2005, issuing as U.S. Pat. No. 7,228,772 on Jun. 12, 2007, which is a continuation of Ser. No. 09/929,244, filed Aug. 13, 2001, issuing as U.S. Pat. No. 6,857,345 on Feb. 22, 2005, which claims the benefit of and priority from U.S. Provisional Patent Application Ser. No. 60/225,212, filed Aug. 14, 2000;

and Ser. No. 12/806,829 is also a continuation of Ser. No. 12/587,695, filed Oct. 9, 2009, issuing as U.S. Pat. No. 7,921,754 on Apr. 12, 2011, which is a continuation of Ser. No. 09/929,237, filed Aug. 13, 2001, issuing as U.S. Pat. No. 7,600,455 on Oct. 13, 2009, which claims the benefit of and priority from U.S. Provisional Patent Application Ser. No. 60/225,059, filed Aug. 14, 2000;

and Ser. No. 12/806,829 is also a continuation of Ser. No. 12/661,766, filed Mar. 22, 2010, issuing as U.S. Pat. No. 8,051,759 on Nov. 8, 2011, which is a continuation of Ser. No. 11/810,196, filed Jun. 4, 2007, issuing as U.S. Pat. No. 7,681,479 on Mar. 23, 2010, which is a continuation of Ser. No. 09/929,234, filed Aug. 13, 2001, issuing as U.S. Pat. No. 7,225,712 on Jun. 5, 2007, which claims the benefit of and priority from U.S. Provisional Patent Application Ser. No. 60/225,094, filed Aug. 14, 2000;

and Ser. No. 12/806,829 is also a continuation of Ser. No. 12/655,694, filed Jan. 4, 2010, issuing as U.S. Pat. No. 7,908,950 on Mar. 22, 2011, which is a continuation of Ser. No. 12/079,836, filed Mar. 27, 2008, issuing as U.S. Pat. No. 7,640,837 on Jan. 5, 2010, which is a continuation of Ser. No. 09/929,235, filed Aug. 13, 2001, issuing as U.S. Pat. No. 7,350,444 on Apr. 1, 2008, which claims the benefit of and priority from U.S. Provisional Patent Application Ser. No. 60/225,058, filed Aug. 14, 2000;

and Ser. No. 12/806,829 is also a continuation of Ser. No. 12/799,211, filed Apr. 19, 2010, issuing as U.S. Pat. No. 8,100,039 on Jan. 24, 2012, which is a continuation of Ser. No. 12/220,946, filed Jul. 29, 2008, issuing as U.S. Pat. No. 7,698,976 on Apr. 20, 2010, which is a continuation of Ser. No. 09/929,238, filed Aug. 13, 2001, now abandoned, which claims the benefit of and priority from U.S. Provisional Patent Application Ser. No. 60/225,057, filed Aug. 14, 2000;

and Ser. No. 12/806,829 is also a continuation of Ser. No. 12/590,924, filed Nov. 16, 2009, issuing as U.S. Pat. No. 8,186,255 on May 29, 2012, which is a continuation of Ser. No. 12/154,675, filed May 23, 2008, issuing as U.S. Pat. No. 7,617,752 on Nov. 17, 2009, which is a continuation of Ser. No. 10/053,390, filed Jan. 16, 2002, issuing as U.S. Pat. No. 7,377,199 on May 27, 2008, which is a continuation-in-part of Ser. No. 09/676,190, filed Sep. 29, 2000, issuing as U.S. Pat. No. 7,055,417 on Jun. 6, 2006;

and Ser. No. 10/053,390 claims the benefit of and priority from U.S. Provisional Patent Application Ser. No. 60/270,011, filed Feb. 20, 2001;

and Ser. No. 12/806,829 is also a continuation of Ser. No. 12/313,162, filed Nov. 17, 2008, issuing as U.S. Pat. No. 7,789,002 on Sep. 7, 2010, which is a continuation of Ser. No. 11/348,580, filed Feb. 6, 2006, now abandoned, which is a continuation of Ser. No. 10/052,705, filed Jan. 16, 2002, issuing as U.S. Pat. No. 6,994,004 on Feb. 7, 2006, which claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, and Ser. No. 60/273,178, filed Mar. 2, 2001;

and Ser. No. 11/348,580 also claims the benefit of and priority from U.S. Provisional Patent Application Ser. No. 60/667,485, filed Mar. 31, 2005;

and Ser. No. 12/313,162 is also a continuation of Ser. No. 11/098,984, filed Apr. 4, 2005, issuing as U.S. Pat. No. 7,353,737 on Apr. 8, 2008, which is a continuation of a Ser. No. 09/929,238, filed Aug. 13, 2001, now abandoned;

and Ser. No. 12/313,162 is also a continuation of Ser. No. 10/047,066, filed Jan. 14, 2002, issuing as U.S. Pat. No. 6,945,148 on Sep. 20, 2005;

and Ser. No. 12/313,162 is also a continuation of Ser. No. 10/051,782, filed Jan. 15, 2002, issuing as U.S. Pat. No. 6,877,410 on Apr. 12, 2005;

and Ser. No. 12/806,829 is also a continuation of Ser. No. 12/661,993, filed Mar. 26, 2010, issuing as U.S. Pat. No. 8,061,246 on Nov. 22, 2011, which is a continuation of Ser. No. 11/982,972, filed Nov. 5, 2007, issuing as U.S. Pat. No. 7,685,912 on Mar. 30, 2010, which is a continuation of Ser. No. 10/932,339, filed Sep. 1, 2004, issuing as U.S. Pat. No. 7,290,472 on Nov. 6, 2007, which is a continuation of Ser. No. 10/047,066, filed Jan. 14, 2002, issuing as U.S. Pat. No. 6,945,148 on Sep. 20, 2005, which claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, and Ser. No. 60/273,902, filed Mar. 6, 2001;

and Ser. No. 10/932,339 is also a continuation of Ser. No. 10/050,085, filed Jan. 14, 2002, now abandoned;

and Ser. No. 12/806,829 is also a continuation of Ser. No. 10/100,211, filed Mar. 13, 2002, which claims the benefit of and priority from U.S. Provisional Patent Application Ser. No. 60/275,583, filed Mar. 13, 2001;

and Ser. No. 12/806,829 is also a continuation of Ser. No. 11/256,757, filed Oct. 24, 2005, issuing as U.S. Pat. No. 8,065,943 on Nov. 29, 2011, which is a continuation of Ser. No. 09/955,418, filed Sep. 17, 2001, issuing as U.S. Pat. No. 6,957,601 on Oct. 25, 2005, which claimed the benefit of and priority to the following of U.S. Provisional Patent Applications: Ser. No. 60/233,459, filed Sep. 18, 2000, Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/279,313, filed Mar. 27, 2001, Ser. No. 60/292,081, filed May 17, 2001, Ser. No. 60/292,100, filed May 17, 2001, Ser. No. 60/298,207, filed Jun. 13, 2001, Ser. No. 60/302,937, filed Jul. 2, 2001, Ser. No. 60/302,916, filed Jul. 3, 2001, Ser. No. 60/306,202, filed Jul. 18, 2001, Ser. No. 60/307,756, filed Jul. 25, 2001, Ser. No. 60/308,492, filed Jul. 27, 2001, and Ser. No. 60/312,141, filed Aug. 13, 2001;

and Ser. No. 12/806,829 is also a continuation of Ser. No. 10/146,527, filed May 15, 2002, which claims the benefit of and priority from U.S. Provisional Patent Application Ser. No. 60/292,100, filed May 17, 2001;

and Ser. No. 12/806,829 is also a continuation of Ser. No. 12/586,469, filed Sep. 21, 2009, now abandoned, which is a continuation of Ser. No. 11/702,330, filed Feb. 5, 2007, issuing as U.S. Pat. No. 7,591,210 on Sep. 22, 2009, which is a continuation of Ser. No. 10/189,031, filed Jul. 2, 2002, issuing as U.S. Pat. No. 7,171,879 on Feb. 6, 2007, which claims the benefit of and priority from U.S. Provisional Patent Application Ser. No. 60/302,937, filed Jul. 2, 2001;

and Ser. No. 12/806,829 is also a continuation of Ser. No. 11/208,214, filed Aug. 19, 2005, issuing as U.S. Pat. No. 7,784,507 on Aug. 31, 2010, which is a continuation of Ser. No. 10/251,576, filed Sep. 20, 2002, now abandoned, which is a continuation of Ser. No. 10/197,975, filed Jul. 18, 2002, now abandoned;

and Ser. No. 10/251,576 claimed the benefit of and priority to U.S. Provisional Patent Application Ser. No. 60/323,975, filed Sep. 21, 2001;

and Ser. No. 11/208,214 is also a continuation of Ser. No. 09/676,190, filed Sep. 29, 2000, issuing as U.S. Pat. No. 7,055,417 on Jun. 6, 2006, which in turn claimed the benefit of and priority from the following U.S. Provisional Patent Applications: Ser. No. 60/157,340, filed Oct. 1, 1999 and Ser. No. 60/182,866, filed Feb. 16, 2000;

and Ser. No. 12/806,829 is also a continuation of Ser. No. 12/231,080, filed Aug. 29, 2008, issuing as U.S. Pat. No. 7,900,541 on Mar. 8, 2011, which is a continuation of Ser. No. 11/487,717, filed Jul. 17, 2006, issuing as U.S. Pat. No. 7,421,315, on Sep. 2, 2008, which is a continuation of U.S. patent application Ser. No. 10/292,607, filed Nov. 12, 2002, issuing as U.S. Pat. No. 7,077,039 on Jul. 18, 2006, which claims the benefit of and priority from U.S. Provisional Patent Application Ser. No. 60/335,970, filed Nov. 13, 2001;

and Ser. No. 12/806,829 is also a continuation of Ser. No. 12/655,962, filed Jan. 11, 2010, now abandoned, which is a continuation of Ser. No. 12/313,277, filed Nov. 17, 2008, issuing as U.S. Pat. No. 7,644,645 on Jan. 12, 2010, which is a continuation of Ser. No. 10/345,630, filed Jan. 15, 2003, now abandoned, which claims the benefit of and priority from U.S. Provisional Patent Application Ser. No. 60/349,989, filed Jan. 16, 2002;

and Ser. No. 12/806,829 is also a continuation of Ser. No. 12/658,759, filed Feb. 12, 2010, now abandoned, which is a continuation of Ser. No. 11/787,471, filed Apr. 17, 2007, issuing as U.S. Pat. No. 7,661,343 on Feb. 16, 2010, which is a continuation of Ser. No. 10/341,260, filed Jan. 13, 2003, now abandoned, which claims the benefit of and priority from U.S. Provisional Patent Application Ser. No. 60/351,797, filed Jan. 25, 2002;

and Ser. No. 12/806,829 is also a continuation of Ser. No. 11/647,676, filed Dec. 29, 2006, issuing as U.S. Pat. No. 7,836,804 on Nov. 23, 2010, which is a continuation of Ser. No. 10/923,290, filed Aug. 20, 2004, issuing as U.S. Pat. No. 7,472,634 on Jan. 6, 2009, which claims the benefit of and priority from U.S. Provisional Patent Application Ser. No. 60/496,550, filed Aug. 20, 2003;

and Ser. No. 12/806,829 is also a continuation of Ser. No. 12/079,820, filed Mar. 27, 2008, issuing as U.S. Pat. No. 7,845,258 on Dec. 7, 2010, which is a continuation of Ser. No. 10/923,273, filed Aug. 20, 2004, issuing as U.S. Pat. No. 7,350,445 on Apr. 1, 2008, which claims the benefit of and priority from U.S. Provisional Patent Application Ser. No. 60/496,574, filed Aug. 20, 2003;

and Ser. No. 12/806,829 is also a continuation of Ser. No. 12/454,569, filed May 18, 2009, issuing as U.S. Pat. No. 7,991,503 on Aug. 2, 2011, which is a continuation of Ser. No. 11/027,600, filed Dec. 31, 2004, issuing as U.S. Pat. No. 7,536,238 on May 19, 2009, which claims the benefit of and priority from U.S. Provisional Patent Application Ser. No. 60/533,791, filed Dec. 31, 2003;

and Ser. No. 12/806,829 is also a continuation of Ser. No. 12/799,915, filed May 3, 2010, issuing as U.S. Pat. No. 8,087,438 on Jan. 3, 2012, which is a continuation of Ser. No. 12/322,069, filed Jan. 26, 2009, issuing as U.S. Pat. No. 7,707,918 on May 4, 2010, which is a continuation of U.S. patent application Ser. No. 11/107,499, filed Apr. 15, 2005, issuing as U.S. Pat. No. 7,481,140 on Jan. 27, 2009;

and Ser. No. 12/806,829 is also a continuation of Ser. No. 12/077,576, filed Mar. 19, 2008, now abandoned, which is a continuation of Ser. No. 11/027,254, filed Dec. 31, 2004, now abandoned, which claims the benefit of and priority from U.S. Provisional Patent Application Ser. No. 60/533,852, filed Dec. 31, 2003;

and Ser. No. 12/806,829 is also a continuation of Ser. No. 12/799,920, filed May 3, 2010, issuing as U.S. Pat. No. 8,122,807 on Feb. 28, 2012, which is a continuation of Ser. No. 11/026,114, filed Dec. 31, 2004, issuing as U.S. Pat. No. 7,707,920 on May 4, 2010, which claims the benefit of and priority from U.S. Provisional Patent Application Ser. No. 60/533,811, filed Dec. 31, 2003;

and Ser. No. 12/806,829 is also a continuation of Ser. No. 11/026,006, filed Dec. 31, 2004, issuing as U.S. Pat. No. 8,459,157 on Jun. 11, 2013, which claims the benefit of and priority from U.S. Provisional Patent Application Ser. No. 60/533,575, filed Dec. 31, 2003;

and Ser. No. 12/806,829 is also a continuation of Ser. No. 11/045,972, filed Jan. 28, 2005, issuing as U.S. Pat. No. 7,827,890 on Nov. 9, 2010, which claims the benefit of and priority from U.S. Provisional Patent Application Ser. No. 60/540,377, filed Jan. 29, 2004;

and Ser. No. 12/806,829 is also a continuation of Ser. No. 12/454,730, filed May 20, 2009, issuing as U.S. Pat. No. 7,997,176 on Aug. 16, 2011, which is a continuation of Ser. No. 11/395,502, filed Mar. 31, 2006, now abandoned, which claims the benefit of and priority from U.S. Provisional Patent Application Ser. No. 60/667,485, filed Mar. 31, 2005.

FIELD

The present invention relates to table saws and more particularly to table saws with safety systems.

BACKGROUND

Safety systems are often employed with power equipment such as table saws, miter saws, band saws, jointers, shapers, circular saws and other machinery, to minimize the risk of injury when using the equipment. Some safety systems include an electronic system to detect the occurrence of a dangerous condition and a reaction system to minimize any possible injury from the dangerous condition. For example, the detection system may detect when the hand of a user approaches or contacts a moving blade, and the reaction system may stop, retract, disable or cover a moving blade upon detection of the dangerous condition.

The present document discloses table saws with safety systems, and switch boxes for use with such table saws.

DETAILED DESCRIPTION

Figure 1:
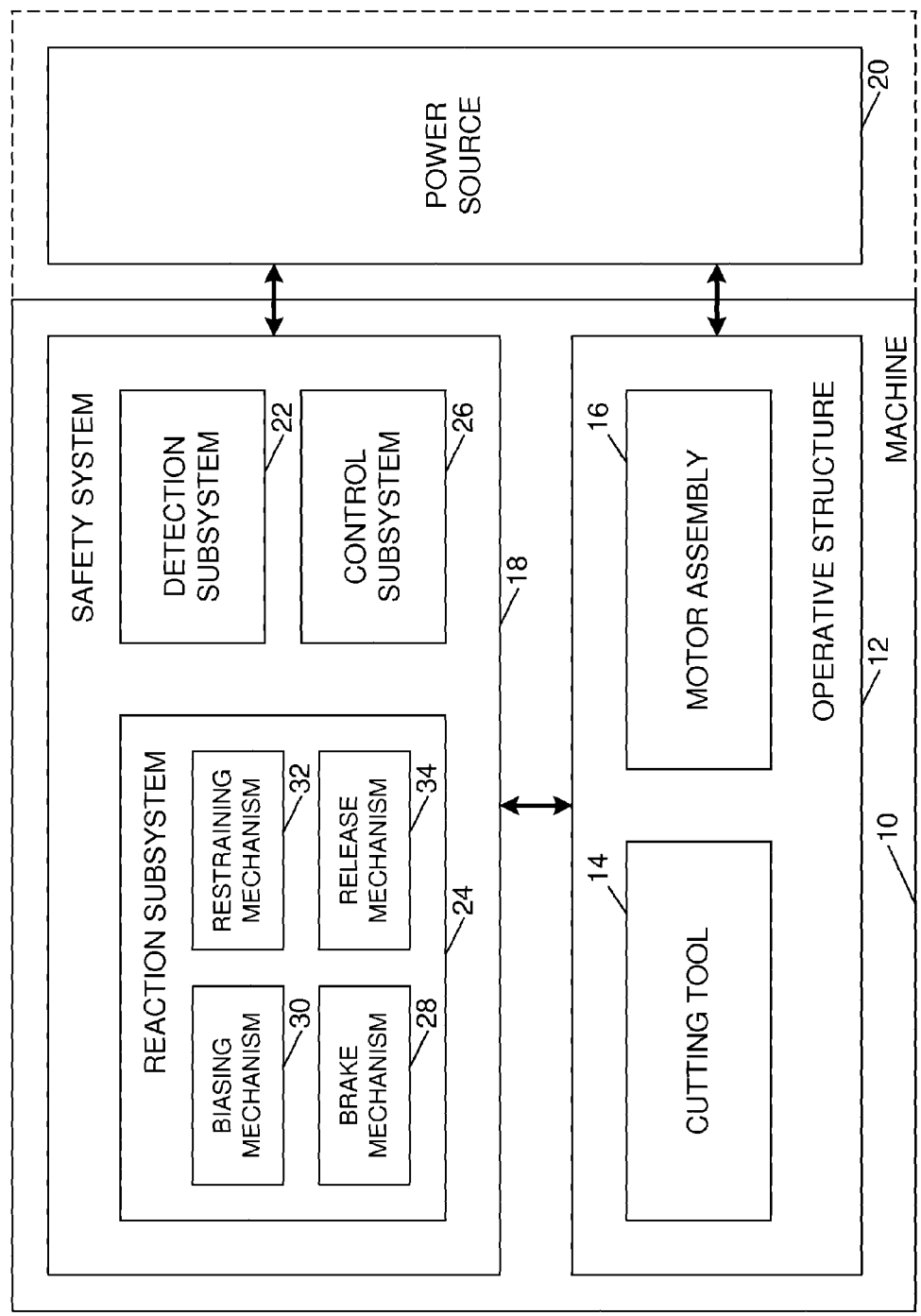
FIG. 1 is a schematic block diagram of a machine with a fast-acting safety system.

A machine that incorporates a safety system is shown schematically in FIG. 1 and indicated generally at 10. Machine 10 may be any of a variety of different machines, such as table saws, miter saws, band saws, jointers, shapers, circular saws, routers, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Refracting the cutting tool is described in more detail in U.S. Patent Application Publication No. 2002/0017181 A1, entitled "Refraction System for Use in Power Equipment," and U.S. Patent Application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon the brake mechanism quickly engages at least a portion of the operative structure to bring the cutting tool to a stop.

Figure 2:
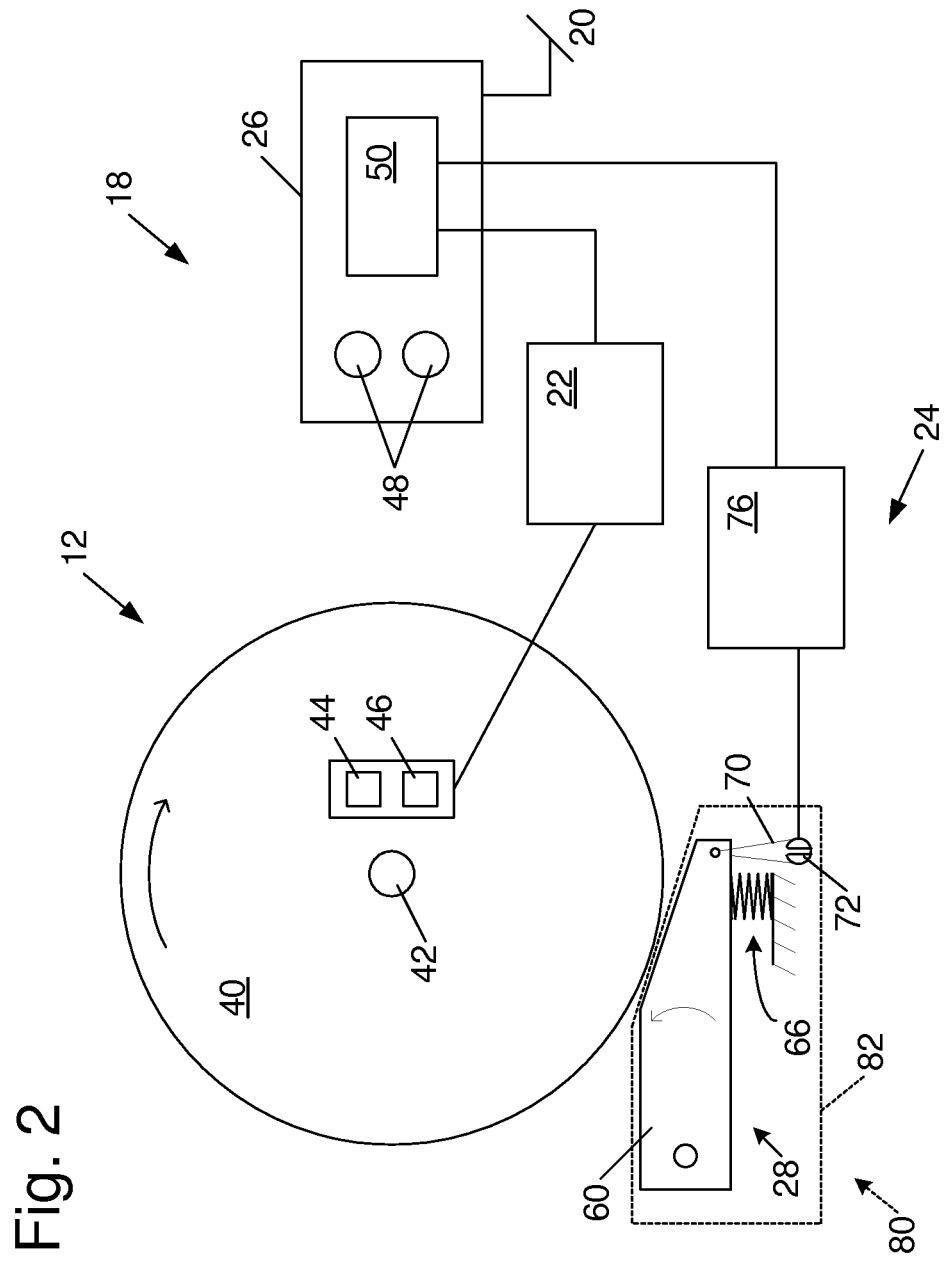
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," and U.S. Provisional Patent Application Ser. No. 60/496,550, entitled "Table Saws With Safety Systems," the disclosures of which are herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. Patent Application Publication No. 2003/0090224 A1, entitled "Detection System for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," and U.S. Patent Application Publication No. 2003/0058121 A1, entitled "Logic Control With Test Mode for Fast-Acting Safety System," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Provisional Patent Application Ser. No. 60/496,568, entitled "Motion Detecting System for use in a Safety System for Power Equipment," the disclosures of which are herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

Figure 3:
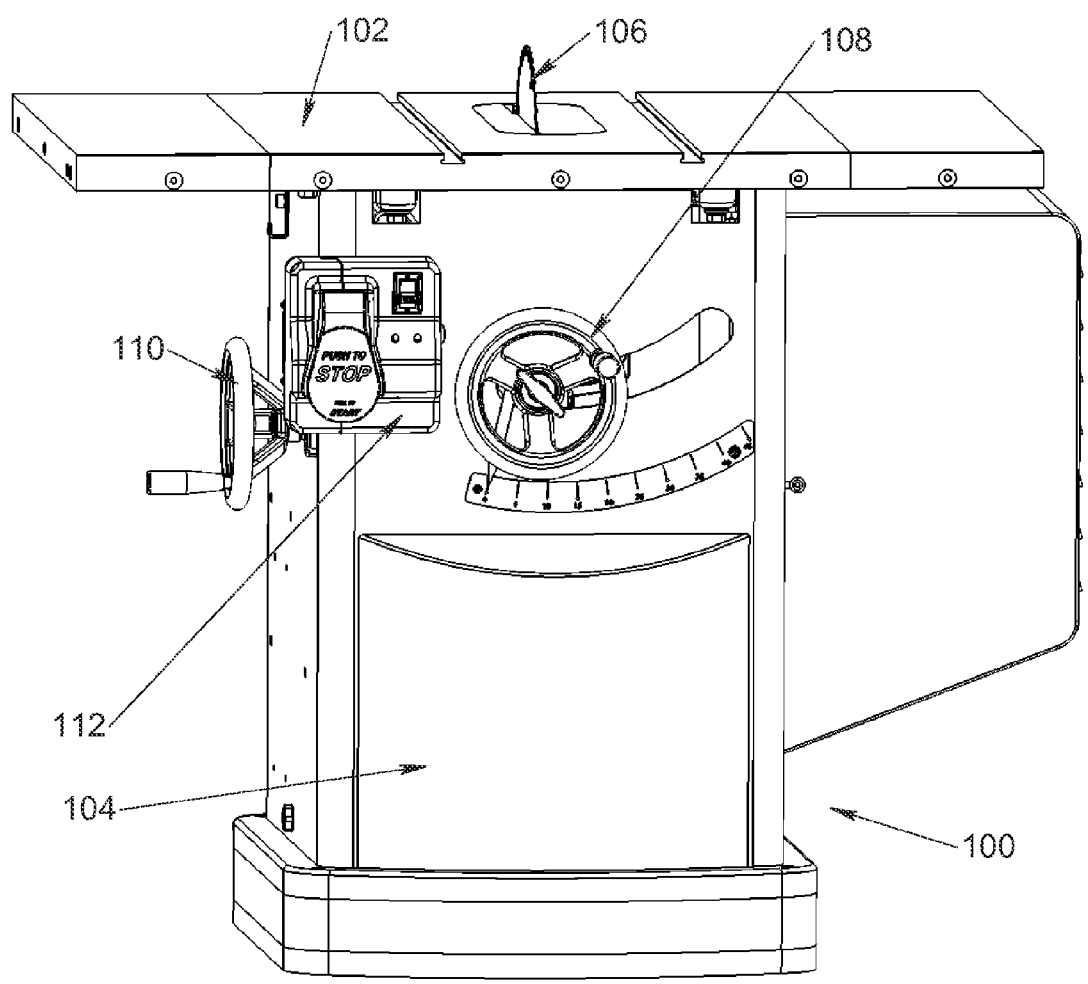
FIG. 3 is a perspective view of a table saw with a switch box.
Figure 4:
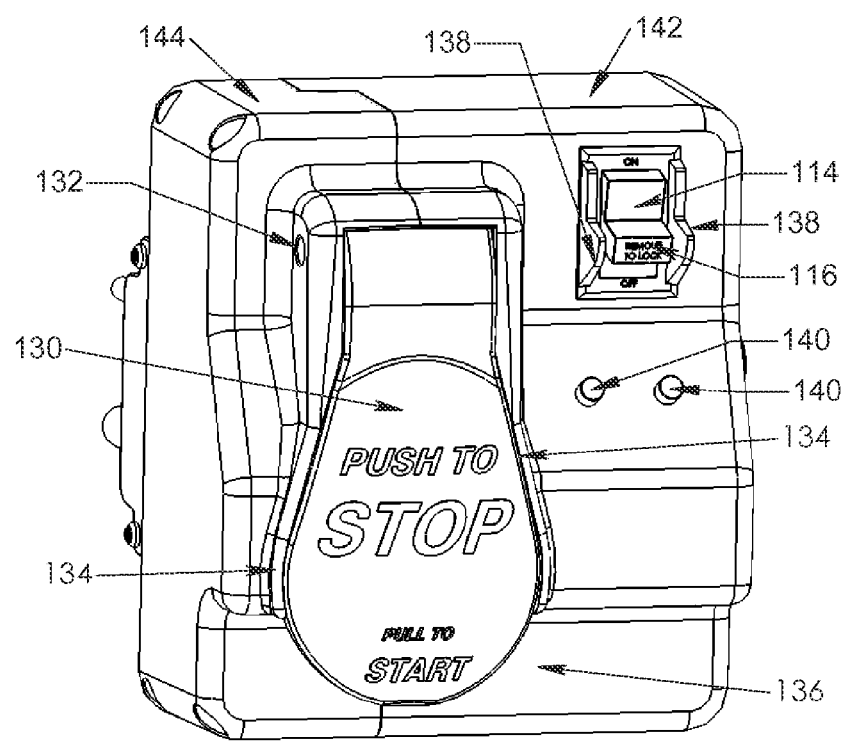
FIG. 4 shows an embodiment of a switch box.

FIG. 3 shows a table saw 100, often called a cabinet saw or tilting-arbor saw, that may include a safety system as described above. Saw 100 includes a table 102 on which a work piece may be cut. The table is mounted on a cabinet 104. A blade 106 extends up through a slot in the table to cut a work piece. A motor assembly (not shown) is supported inside the cabinet to drive the blade. Hand wheels 108 and 110 may be turned to adjust the elevation of the blade (the height the blade extends above the table) and the tilt of the blade relative to the tabletop. In operation, a user makes a cut by pushing a work piece on the table past the spinning blade.

Saw 100 and its safety system are controlled by a switch box 112 mounted on the saw. The switch box is shown in more detail in FIGS. 4 through 7. The switch box may be mounted to the saw in any known manner, such as by screws extending through mounting flanges. One mounting flange is identified in FIG. 5 at 113. The switch box typically would include at least part of the electronics necessary to control the operation of the saw.

Switch box 112 includes a power switch 114 that switches power to the control subsystem of the saw. In other words, when switch 114 is on, electricity is supplied to circuitry that is part of the control subsystem. Power switch 114 includes a removable actuator 116. The switch will function when the actuator is present, but cannot be turned on if the actuator is removed. Using a switch with a removable actuator allows a person to control the use of the saw and prevent unauthorized or accidental operation of the switch.

Figure 5:
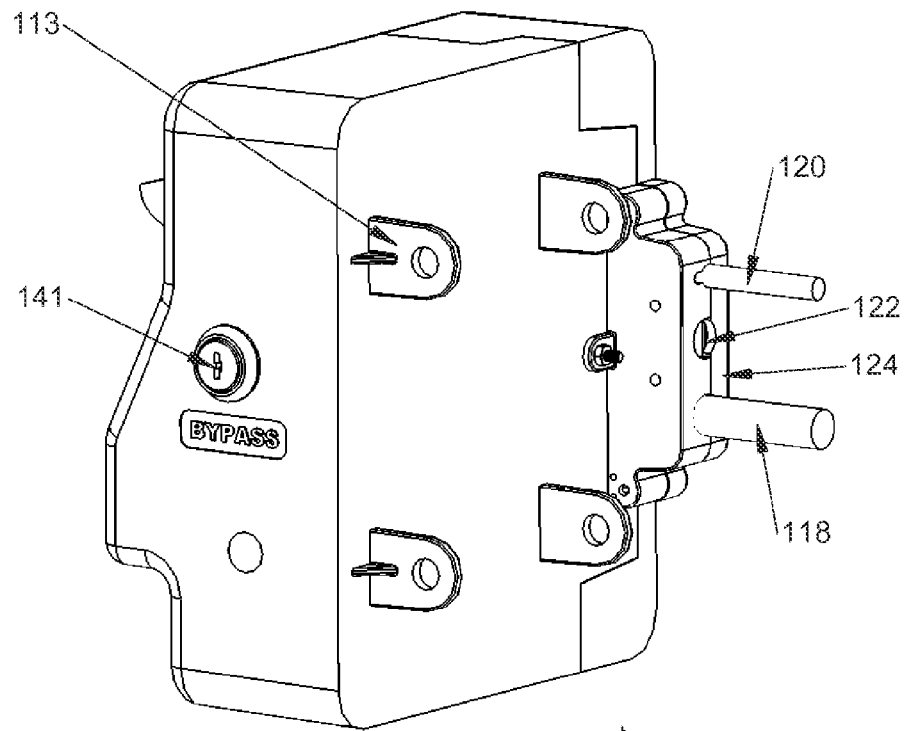
FIG. 5 shows the back of the switch box of FIG. 4.
Figure 6:
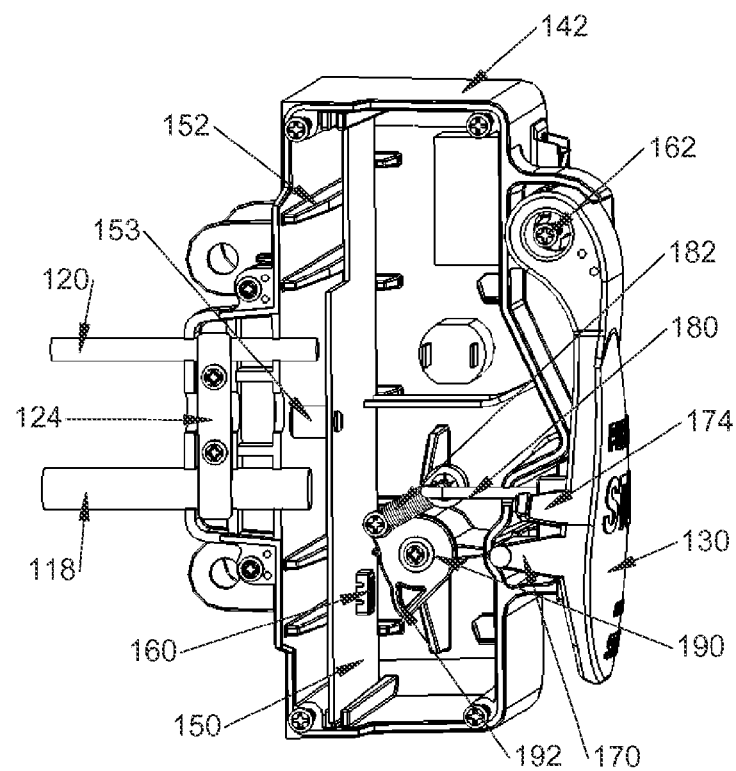
FIG. 6 shows the right half of the switch box of FIG. 4.

Power is supplied to switch box 112 by a cord 118 entering into the switch box through the back, as shown in FIG. 5. Cord 118 passes through a strain relief 124 as it enters the switch box. The strain relief is made from a metal plate that clamps over the cords as shown in FIG. 6. Signals may be sent out of the switch box through cord 120 or, in some applications, through another cord that would exit the switch box from aperture 122. The cords may connect to various parts of the machine, such as to the reaction system, to a brake cartridge and/or to a motor.

Switch box 112 also includes a start/stop paddle switch 130 mounted to pivot in and out around pivot 132. Paddle switch 130 is designed so that a predetermined function of the tool, such as starting the blade spinning in a table saw, is accomplished by pulling the paddle out. Pushing the paddle in causes the predetermined function to stop. Paddle switch 130 is sized large enough so that it can be easily accessed and actuated by a user. For example, a user can bump the paddle switch with a knee or thigh or slap the switch with the palm to stop the predetermined function in a potentially dangerous situation. Paddle switch 130 will not start the predetermined function, however, until and unless power switch 114 is turned on.

Switch box 112 is formed with projections or walls 134 that extend out and around paddle switch 130 to prevent accidental contact with the paddle causing the tool to start. The switch box is also formed with an indentation 136. An end of paddle switch 130 extends out and over indentation 136 so a user can reach under the paddle to pull it out and start the machine. Power switch 114 also has walls 138 to protect the power switch from being turned on by accidental contact.

Switch box 112 includes a user interface to indicate the status of the machine. In the embodiment shown in FIG. 4 the user interface comprises two light-emitting diodes 140. One diode may be red, for example, and it could be used to signal a problem or error with the machine. The other diode may be green and it could be used to indicate that the machine is okay and ready to use. The diodes also indicate when power switch 114 is turned on. Alternatively, only one diode or more than two diodes may be used as a user interface, or a LCD display may be used instead of diodes. The user interface may be positioned on an angled surface, as shown, so that it is easier to see by a user standing over the switch box.

Switch box 112 also includes a bypass switch 141 shown in FIG. 5. The bypass switch is used to deactivate the safety system when desired. In the depicted embodiment, the bypass switch is a key switch, so it can only be used with a specific key.

Figure 7:
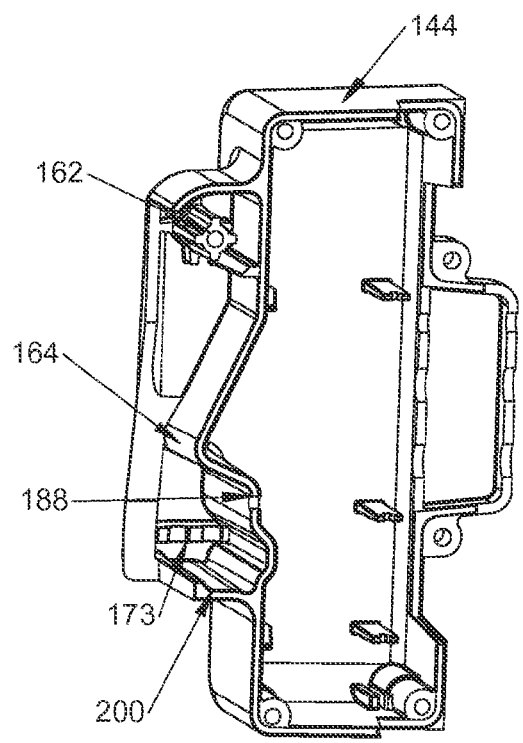
FIG. 7 shows the left half of the switch box of FIG. 4.

Switch box 112 is assembled from two halves 142 and 144 that are screwed together. Each half typically would be a molded part made of a plastic such as ABS. Right half 142 is the larger of the two halves and it is shown in FIG. 6. It houses a circuit board 150 (which is part of the control subsystem) supported by plastic flanges and tabs, such as flange 152. The flanges and tabs are configured to hold circuit board 150 in place. The circuit board also may be held in place by a spacer and screw, as shown at 153 in FIG. 6. Power switch 114, cables 118 and 120, paddle switch 130, LEDs 140, and bypass switch 141 would all be electrically connected to the circuit board. Left half 144 of the switch box is shown in FIG. 7, and it acts as a lid or cover for right half 142. With this construction, a user may remove left half 144 to service circuit board 150 or other components without having to remove the switch box from the machine and without having to disconnect switches or other components from the switch box.

Paddle switch 130 is designed to activate a small tactile switch 160 mounted on circuit board 150. The tactile switch is an electronic component that may be used in the control subsystem to control the function of the machine. Typically, the control subsystem will include a microprocessor, and the tactile switch would be a logic switch.

Tactile switch 160 provides an economical way to control the operation of the machine. However, a tactile switch typically requires only a small movement and minimal force to operate, while a user of a machine such as a table saw is accustomed to a switch that requires significant force to operate and that has a solid movement and feel. Paddle switch 130 is designed to provide the user with a robust switch having a positive movement while at the same time triggering tactile switch 160 with only the required force.

Figure 8:
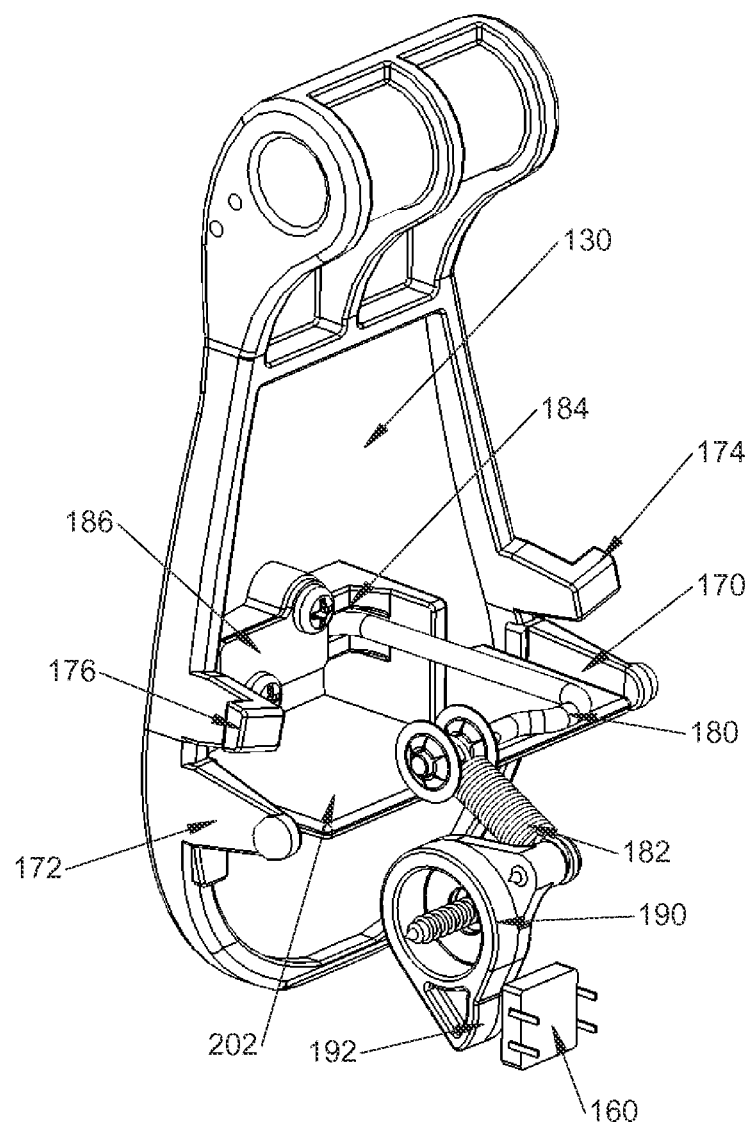
FIG. 8 shows a paddle switch used in the switch box of FIG. 4.

Paddle switch 130 is sandwiched on corresponding posts 162 on the right and left halves of the switch box, as shown in FIGS. 6 and 7. The outer surfaces of the two halves under the paddle switch each include a projection 164 that acts as a stop to limit the inward pivoting of the paddle switch. A perspective view of the back of paddle switch 130 is shown in FIG. 8, and it includes two tabs 170 and 172, each tab extending inwardly relative to the switch box from one side of the large end of the paddle. The tabs mesh with corresponding surfaces on the two halves of the switch box, such as surface 173 shown in FIG. 7, to provide friction when the paddle is pulled out or pushed in. The two tabs and corresponding surfaces also provide a definite engagement and they may be configured so the paddle "clicks" or "snaps" into place as it moves. Paddle 130 also includes stops 174 and 176 that mesh with corresponding surfaces on the two halves of the switch box to prevent the paddle from being pulled out too far.

A connecting link 180 extends between paddle switch 130 and a spring 182. One end of the link is held in a trough 184 in the underside of the paddle switch by a plate 186 that is screwed down over the link. In this manner, the link can pivot slightly in the trough but cannot escape. The link then extends through an aperture 188 in the switch box and connects to spring 182. Spring 182, in turn, is connected to an actuator 190 mounted to pivot in the switch box adjacent tactile switch 160. Actuator 190 includes a tab 192, as shown.

When a user pulls paddle switch 130 out, link 180 moves out and stretches spring 182. Spring 182, in turn, causes actuator 190 to pivot and tab 192 to contact and trigger tactile switch 160. Spring 182 acts as a force regulator and limiter to prevent too much force being applied to the tactile switch. Thus, a user may pull paddle switch 130 out with a substantial force while spring 182 causes actuator 190 to apply a regulated, smaller force to the tactile switch. When a user pushes the paddle switch back in to turn off the machine, link 180 moves in and causes spring 182 to move together. The spring then pushes actuator 190 away from the tactile switch. Additionally, the tactile switch in biased toward the off position with a small internal spring force, so the tactile switch itself pushes actuator 190 away when the paddle switch is moved in.

The switch box is essentially totally enclosed, except for aperture 188 under the paddle, to prevent dust from entering into the switch box. The switch box also includes a wall 200 under paddle switch 130, and paddle 130 includes a corresponding wall 202 extending in toward the switch box. Those walls limit how far a person may reach under the paddle. The walls also protect connecting link 180 under the paddle.

Switch box 112 has been discussed as mounted on a table saw. Of course, the switch box may be used with other types of machines and with other power tools having various safety systems.

Figure 9:
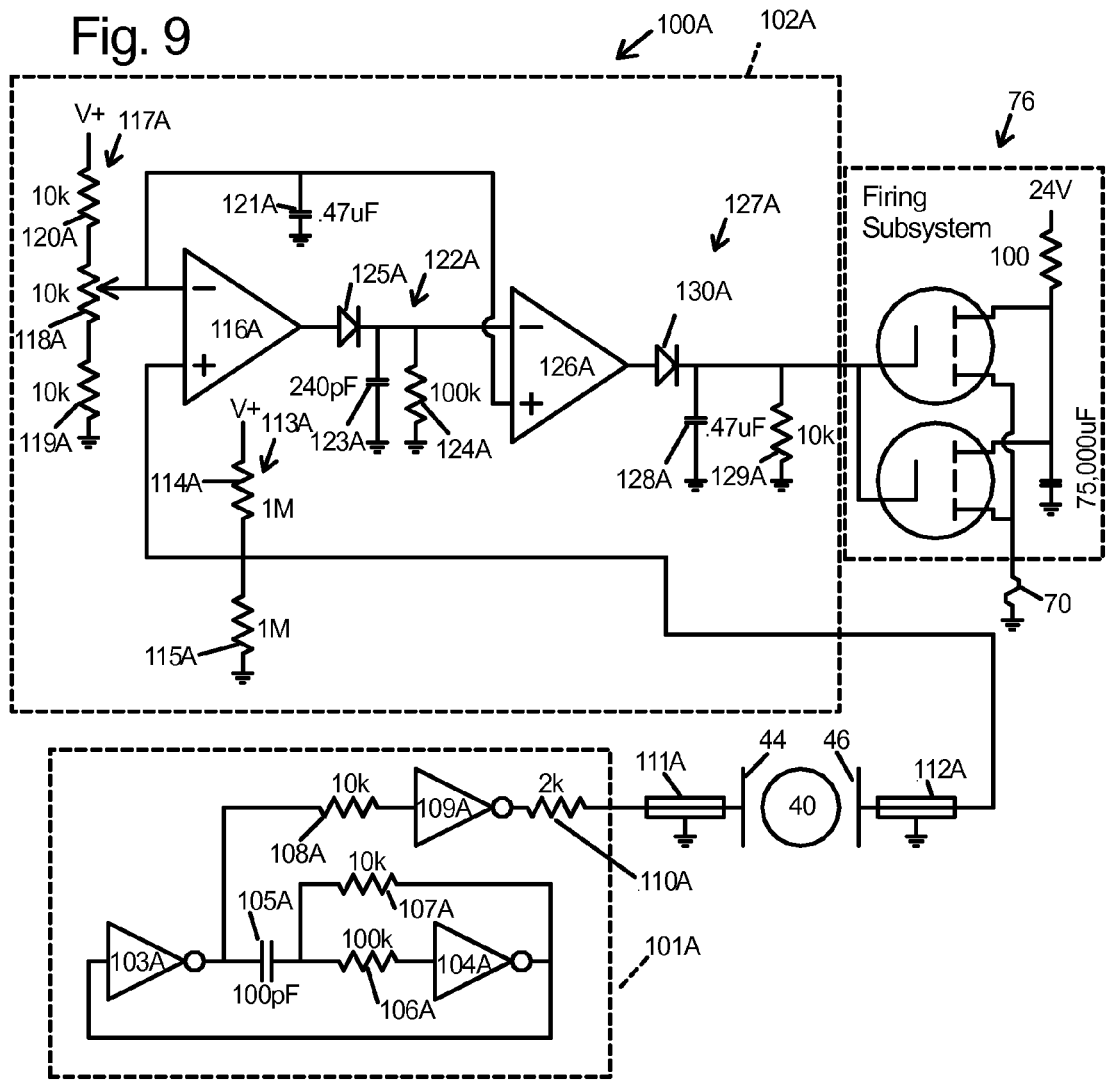
FIG. 9 is a schematic circuit diagram of an electronic subsystem for the safety system of FIG. 1, including an excitation system, a contact sense system and a firing system.

One example of an electronic subsystem 100A of contact detection subsystem 22 according to the present invention is illustrated in more detail in FIG. 9. Electronic subsystem 100A is adapted to work with the two-plate capacitive coupling system described in U.S. Provisional Patent Application Ser. No. 60/225,211, entitled "Apparatus and Method for Detecting Dangerous Conditions in Power Equipment," filed Aug. 14, 2000. Electronic subsystem 100A includes an excitation system 101A and a monitoring or contact sensing system 102A. However, it will be appreciated by those of skill in the electrical arts that the exemplary configuration of electronic subsystem 100A illustrated in FIG. 9 is just one of many configurations which may be used. Thus, it will be understood that any suitable embodiment or configuration could be used within the scope of the invention.

As shown in FIG. 9, excitation system 101A includes an oscillator circuit that generates a wave input signal, such as a square wave signal, at a frequency of approximately 200 khz and voltage amplitude of 12 volts. Alternatively, excitation system 101A may be configured to generate a signal of a different frequency and/or a different amplitude and/or different waveform. The oscillator is formed by a pair of inverters 103A, 104A from a CD4040 configured as a bistable oscillator. The output of inverter 103A is connected to a 100 pF capacitor 105A, which is connected through a 100 kΩ resistor 106A to the input of inverter 104A. A 10 kΩ resistor 107A is connected between the output of inverter 104A to the junction between capacitor 105A and resistor 106A. The output of inverter 104A is connected to the input of inverter 103A. A 10 kΩ resistor 108A connects the output of inverter 103A to the input of another inverter 109A, which serves as an output buffer to drive the input wave signal onto the blade. A 2 kΩ series resistor 110A functions to reduce any ringing in the input signal by damping the high frequency components of the signal.

It will be appreciated that the particular form of the oscillator signal may vary and there are many suitable waveforms and frequencies that may be utilized. The waveform may be chosen to maximize the signal-to-noise ratio, for example, by selecting a frequency at which the human body has the lowest resistance or highest capacitance relative to the workpiece being cut. As an additional variation, the signal can be made asymmetric to take advantage of potentially larger distinctions between the electrical properties human bodies and green wood at high frequency without substantially increasing the radio-frequency power radiated. For instance, utilizing a square wave with a 250 khz frequency, but a duty cycle of five percent, results in a signal with ten times higher frequency behavior than the base frequency, without increasing the radio-frequency energy radiation. In addition, there are many different oscillator circuits that are well known in the art and which would also be suitable for generating the excitation signal.

The input signal generated by the oscillator is fed through a shielded cable 111A onto charge plate 44. Shielded cable 111A functions to insulate the input signal from any electrical noise present in the operating environment, insuring that a "clean" input signal is transmitted onto charge plate 44. Also, the shielded cable reduces cross talk between the drive signal and the detected signal that might otherwise occur should the cables run close together. Alternatively, other methods may be used to prevent noise in the input signal. As a further alternative, monitoring system 102A may include a filter to remove any noise in the input signal or other electrical noise detected by charge plate 46. Shielded cable 111A also reduces radio-frequency emissions relative to an unshielded cable.

As described in more detail in U.S. Provisional Patent Application Ser. No. 60/225,211, entitled "Apparatus and Method for Detecting Dangerous Conditions in Power Equipment," filed Aug. 14, 2000, the input signal is coupled from charge plate 44 to charge plate 46 via blade 40. As shown in FIG. 9, the signal received on charge plate 46 is then fed via a shielded cable 112A to monitoring system 102A. The monitoring system is configured to detect a change in the signal due to contact between the user's body and the blade. It will be appreciated that monitoring system 102A may be implemented in any of a wide variety of designs and configurations. In the exemplary embodiment depicted in FIG. 9, monitoring system 102A compares the amplitude of the input signal received at charge plate 46 to a determined reference voltage. In the event that the input signal received at charge plate 46 falls below the reference voltage for a determined time, the monitoring system produces an output signal to reaction subsystem 24. The reaction subsystem is configured to receive the output signal and immediately act.

The particular components of monitoring system 102A may vary depending on a variety of factors including the application, the desired sensitivity, availability of components, type of electrical power available, etc. In the exemplary embodiment, a shielded cable 112A is connected between charge plate 46 and a voltage divider 113A. Voltage divider 113A is formed by two 1MΩ resistors 114A, 115A connected in series between the supply voltage (typically about 12 volts) and ground. The voltage divider functions to bias the output signal from charge plate 46 to an average level of half of the supply voltage. The biased signal is fed to the positive input of an op-amp 116A. Op-amp 116A may be any one of many suitable op-amps that are well known in the art. An example of such an op-amp is a TL082 op-amp. The negative input of the op-amp is fed by a reference voltage source 117A. In the exemplary embodiment, the reference voltage source is formed by a 10 kΩ potentiometer 118A coupled in series between two 10 kΩ resistors 119A, 120A, which are connected to ground and the supply voltage, respectively. A 0.47 μF capacitor 121A stabilizes the output of the reference voltage.

As will be understood by those of skill in the art, op-amp 116A functions as a comparator of the input signal and the reference voltage. Typically, the voltage reference is adjusted so that its value is slightly less than the maximum input signal voltage from charge plate 46. As a result, the output of the op-amp is low when the signal voltage from the charge plate is less than the reference voltage and high when the signal voltage from the charge plate is greater than the reference voltage. Where the input signal is a periodic signal such as the square wave generated by excitation system 101A, the output of op-amp 116A will be a similar periodic signal. However, when a user contacts the blade, the maximum input signal voltage decreases below the reference voltage and the op-amp output no longer goes high.

The output of op-amp 116A is coupled to a charging circuit 122A. Charging circuit 122A includes a 240 pF capacitor 123A that is connected between the output of op-amp 116A and ground. A 100 kΩ discharge resistor 124A is connected in parallel to capacitor 123A. When the output of op-amp 116A is high, capacitor 123A is charged. Conversely, when the output of op-amp 116A is low, the charge from capacitor 123A discharges through resistor 124A with a time constant of approximately 24 μs. Thus, the voltage on capacitor 123A will discharge to less than half the supply voltage in approximately 25-50 μs unless the capacitor is recharged by pulses from the op-amp. A diode 125A prevents the capacitor from discharging into op-amp 96. Diode 125A may be any one of many suitable diodes that are well known in the art, such as a 1N914 diode. It will be appreciated that the time required for capacitor 123A to discharge may be adjusted by selecting a different value capacitor or a different value resistor 124A.

As described above, charging circuit 122A will be recharged repeatedly and the voltage across capacitor 123A will remain high so long as the detected signal is received substantially unattenuated from its reference voltage at op-amp 116A. The voltage from capacitor 123A is applied to the negative input of an op-amp 126A. Op-amp 126A may be any one of many suitable op-amps, which are well known in the art, such as a TL082 op-amp. The positive input of op-amp 126A is tied to a reference voltage, which is approximately equal to one-half of the supply voltage. In the exemplary embodiment depicted in FIG. 9, the reference voltage is provided by reference voltage source 117A.

So long as charging circuit 122A is recharged, the output of op-amp 126A will be low. However, if the output of op-amp 116A does not go high for a period of 25-50 µs, the voltage across capacitor 123A will decay to less than the reference voltage, and op-amp 126A will output a high signal indicating contact between the user's body and the blade. As described in U.S. Provisional Patent Application Ser. No. 60/225,056, entitled "Firing Subsystem for Use in a Fast-Acting Safety System," U.S. Provisional Patent Application Ser. No. 60/225,170, entitled "Spring-Biased Brake Mechanism," and U.S. Provisional Patent Application Ser. No. 60/225,169, entitled "Brake Mechanism for Power Equipment," all filed Aug. 14, 2000, the output signal from op-amp 126A is coupled to actuate reaction subsystem 24. The time between contact and activation of the reaction system can be adjusted by selecting the time constant of capacitor 123A and resistor 124A.

It should be noted that, depending on the size, configuration and number of teeth on the blade and the position of contact with the operator, the electrical contact between the operator and blade will often be intermittent. As a result, it is desirable that the system detect contact in a period less than or equal to the time a single tooth would be in contact with a user's finger or other body portion. For example, assuming a 10-inch circular blade rotating at 4000 rpm and a contact distance of about one-quarter of an inch (the approximate width of a fingertip), a point on the surface of the blade, such as the point of a tooth, will be in contact with the user for approximately 100 µs. After this period of contact, there will normally be an interval of no contact until the next tooth reaches the finger. The length of the contact and non-contact periods will depend on such factors as the number of teeth on the blade and the speed of rotation of the blade.

It is preferable, though not necessary, to detect the contact with the first tooth because the interval to the second tooth may be substantial with blades that have relatively few teeth. Furthermore, any delay in detection increases the depth of cut that the operator will suffer. Thus, in the exemplary embodiment, the charging circuit is configured to decay within approximately 25-50 µs to ensure that monitoring system 102A responds to even momentary contact between the user's body and the blade. Further, the oscillator is configured to create a 200 khz signal with pulses approximately every 5 µs. As a result, several pulses of the input signal occur during each period of contact, thereby increasing the reliability of contact detection. Alternatively, the oscillator and charging circuit may be configured to cause the detection system to respond more quickly or more slowly. Generally, it is desirable to maximize the reliability of the contact detection, while minimizing the likelihood of erroneous detections.

As described above, the contact between a user's body and the teeth of the blade might be intermittent depending on the size and arrangement of the teeth. Although monitoring system 102A typically is configured to detect contact periods as short as 25-50 µs, once the first tooth of the blade passes by the user's body, the contact signal received by the second electrical circuit may return to normal until the next tooth contacts the user's body. As a result, while the output signal at op-amp 126A will go high as a result of the first contact, the output signal may return low once the first contact ends. As a result, the output signal may not remain high long enough to activate the reaction system. For instance, if the output signal does not remain high long enough to actuate firing subsystem 76, fusible member 70, may not melt. Therefore, monitoring system 102A may include a pulse extender in the form of charging circuit 127A on the output of op-amp 126A, similar to charging circuit 122A. Once op-amp 126A produces a high output signal, charging circuit 127A functions to ensure that the output signal remains high long enough to sufficiently discharge the charge storage devices to melt the fusible member. In the exemplary embodiment, charging circuit 127A includes a 0.47 µF capacitor 128A connected between the output of op-amp 126A and ground. When the output of op-amp 126A goes high, capacitor 128A charges to the output signal level. If the output of op-amp 126A returns low, the voltage across capacitor 128A discharges through 10 k resistor 129A with a time constant of approximately 4.7 ms. A diode 130A, such as an 1N914 diode, prevents capacitor 128A from discharging through op-amp 126A. The pulse extender insures that even a short contact with a single tooth will result in activation of the reaction system.

The above-described system is capable of detecting contact within approximately 50 µs and activating the reaction system. As described in more detail in U.S. Provisional Patent Application Ser. No. 60/225,056, entitled "Firing Subsystem for Use in a Fast-Acting Safety System," U.S. Provisional Patent Application Ser. No. 60/225,170, entitled "Spring-Biased Brake Mechanism," and U.S. Provisional Patent Application Ser. No. 60/225,169, entitled "Brake Mechanism for Power Equipment," all filed Aug. 14, 2000, in the context of a reaction system for braking a saw blade, a brake can be released in approximately less than 100 µs and as little as 20 µs. The brake contacts the blade in approximately one to approximately three milliseconds. The blade will normally come to rest within not more than 2-10 ms of brake engagement. As a result, injury to the operator is minimized in the event of accidental contact with the cutting tool. With appropriate selection of components, it may be possible to stop the blade within 2 ms, or less.

While exemplary embodiments of excitation system 101A and monitoring system 102A have been described above with specific components having specific values and arranged in a specific configuration, it will be appreciated that these systems may be constructed with many different configurations, components, and values as necessary or desired for a particular application. The above configurations, components, and values are presented only to describe one particular embodiment that has proven effective, and should be viewed as illustrating, rather than limiting, the invention.

Figure 10:
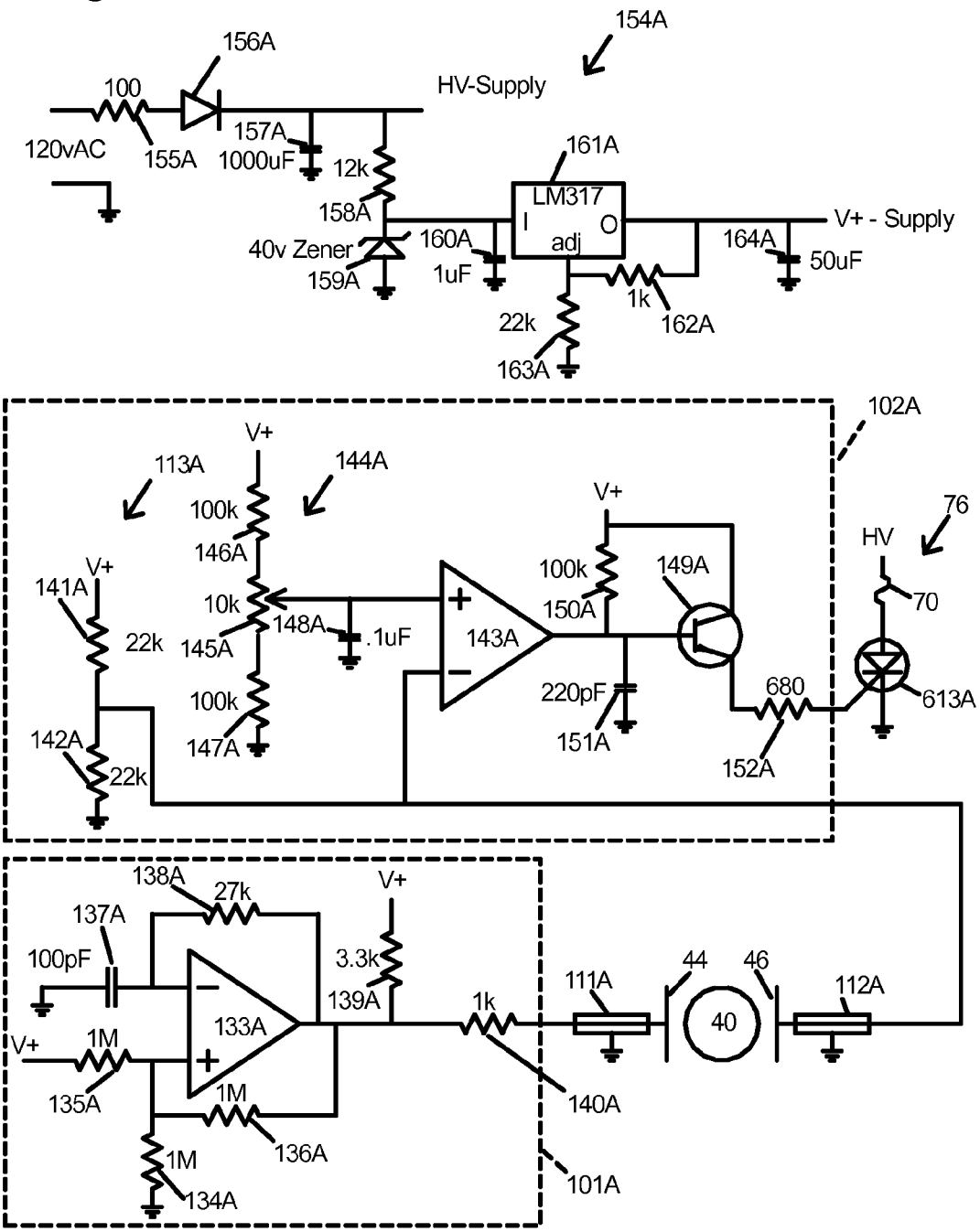
FIG. 10 is a schematic circuit diagram of a first alternative electronic subsystem for the safety system of FIG. 1, including an excitation system, a contact sense system and a firing system.

FIG. 10 shows alternative embodiments of excitation system 101A and monitoring system 102A, as well as firing system 76, which is described in more detail in U.S. Provisional Patent Application Ser. No. 60/225,056, titled "Firing Subsystem for Use in a Fast-Acting Safety System," filed Aug. 14, 2000. Alternative excitation system 101A is configured to generate a square wave signal using only a single comparator 133A such as an LM393 comparator. A 1M resistor 134A is connected between the high input terminal of comparator 133A and ground. Another 1M resistor 135A is connected between the high input terminal of comparator 133A and a low voltage supply V. A 1M resistor 136A is connected between the high input terminal of the comparator and the output of the comparator. A 100 pF capacitor 137A is connected between the low input terminal of the comparator and ground. A 27 k resistor 138A is connected between the low input terminal of the comparator and the output of the comparator. A 3.3 k resistor 139A is connected between the low voltage supply V and the output of the comparator. The alternative oscillator circuit illustrated in FIG. 12 produces a square wave having a frequency of approximately 3-500 khz A 1 k resistor 140A is connected between the output of the comparator and shielded cable 111A to reduce ringing. It will be appreciated that the values of one or more elements of alternative excitation system 101A may be varied to produce a signal having a different frequency, waveform, etc.

As in the exemplary embodiment described above, the signal generated by alternative excitation system 101A is fed through shielded cable 111A to charge plate 44. The signal is capacitively coupled to charge plate 46 via blade 40. Alternative monitoring system 102A receives the signal from charge plate 46 via shielded cable 112A and compares the signal to a reference voltage. If the signal falls below the reference voltage for approximately 25 µs, an output signal is generated indicating contact between the blade and the user's body. Alternative monitoring system 102A includes a voltage divider 113A, which is formed of 22 k resistors 141A and 142A. The voltage divider biases the signal received via cable 112A to half the low voltage supply V. The lower resistance of resistors 141A, 142A relative to resistors 114A, 115A serves to reduce 60 hz noise because low-frequency signals are attenuated. The biased signal is fed to the negative input terminal of a second comparator 143A, such as an LM393 comparator. The positive terminal of comparator 143A is connected to reference voltage source 144A. In the depicted embodiment, the reference voltage source is formed by a 10 kΩ potentiometer 145A coupled in series between two 100 kΩ resistors 146A, 147A connected to the low voltage supply V and ground, respectively. A 0.1 µF capacitor 148A stabilizes the output of the reference voltage. As before, the reference voltage is used to adjust the trigger point.

The output of second comparator 143A is connected to the base terminal of an NPN bipolar junction transistor 149A, such as a 2N3904 transistor. The base terminal of transistor 149A is also connected to low voltage supply V through a 100 k resistor 150A, and to ground through a 220 pF capacitor 151A. Potentiometer 145A is adjusted so that the voltage at the positive terminal of comparator 143A is slightly lower than the high peak of the signal received at the negative terminal of the second comparator when there is no contact between the blade and the user's body. Thus, each high cycle of the signal causes the second comparator output to go low, discharging capacitor 151A. So long as there is no contact between the blade and the user's body, the output of the second comparator continues to go low, preventing capacitor 151A from charging up through resistor 150A and switching transistor 149A on. However, when the user's body contacts the blade or other isolated element, the signal received at the negative terminal of the second comparator remains below the reference voltage at the positive terminal and the output of the second comparator remains high. As a result, capacitor 151A is able to charge up through resistor 150A and switch transistor 149A on.

The collector terminal of transistor 149A is connected to low voltage supply V, while the emitter terminal is connected to 680Ω resistor 152A. When transistor 149A is switched on, it supplies an output signal through resistor 152A of approximately 40 mA, which is fed to alternative firing system 76. As described in more detail in U.S. Provisional Patent Application Ser. No. 60/225,056, titled "Firing Subsystem for Use in a Fast-Acting Safety System," filed Aug. 14, 2000, the alternative firing circuit includes fusible member 70 connected between a high voltage supply HV and an SCR 613A, such as an NTE 5552 SCR. The gate terminal of the SCR is connected to resistor 152A. Thus, when transistor 149A is switched on, the approximately 40 mA current through resistor 152A turns on SCR 613A, allowing the high voltage supply HV to discharge to ground through fusible member 70. Once the SCR is switched on, it will continue to conduct as long as the current through fusible member 70 remains above the holding current of approximately 40 mA, even if the current to the gate terminal is removed. Thus, the SCR will conduct current through the fusible member until the fusible member is melted or the high voltage source is exhausted or removed. The fact that the SCR stays on once triggered allows it to respond to even a short pulse through resistor 152A.

FIG. 10 also illustrates an exemplary electrical supply system 154A configured to provide both low voltage supply V and high voltage supply HV from standard 120 VAC line voltage. Electrical supply system 154A is connected to provide low voltage supply V and high voltage supply HV to alternative excitation system 101A, alternative monitoring system 102A, and alternative firing system 76. The line voltage is connected through a 100Ω resistor 155A and a diode 156A, such as a 1N4002 diode, to a 10000 µF charge storage capacitor 157A. The diode passes only the positive portion of the line voltage, thereby charging capacitor 157A to approximately 160V relative to ground. The positive terminal of capacitor 157A serves as the high voltage supply HV connected to fusible link 70. When SCR 613A is switched on upon detection of contact between the blade and the user's body, the charge stored in capacitor 157A is discharged through the fusible link until it melts. It will be appreciated that the size of capacitor 157A may be varied as required to supply the necessary current to melt fusible member 70. As described in U.S. Provisional Patent Application Ser. No. 60/225,056, titled "Firing Subsystem for Use in a Fast-Acting Safety System," filed Aug. 14, 2000, use of a HV capacitor leads to a much higher current surge, and therefore a faster melting of the fusible member than is the case with a low voltage system.

The positive terminal of capacitor 157A also provides a transformer-less source of voltage for low voltage supply V, which includes a 12 k resistor 158A connected between the positive terminal of capacitor 157A and a reverse 40V Zener diode 159A. Diode 159A functions to maintain a relatively constant 40V potential at the junction between the diode and resistor 158A. It can be seen that the current through the 12 k resistor will be about 10 mA. Most of this current is used by the low voltage circuit, which has a relatively constant current demand of about 8 mA. Note that while resistor 158A and diode 159A discharge some current from capacitor 157A, the line voltage supply continuously recharges the capacitor to maintain the HV supply. A 0.1 µF capacitor 160A is connected in parallel with diode 159A to buffer the 40V potential of the diode, which is then connected to the input terminal of an adjustable voltage regulator 161A, such as an LM317 voltage regulator. The ratio of a 1 k resistor 162A connected between the output terminal and adjustment terminal, and a 22 k resistor 163A connected between the adjustment terminal and ground, set the output voltage of regulator 161A to approximately 30 VDC. A 50 µF capacitor 164A is connected to the output terminal of regulator 161A to buffer sufficient charge to ensure that low voltage supply V can provide the brief 40 mA pulse necessary to switch on SCR 613A. The described low voltage source is advantageous because of its low cost and low complexity.

It should be noted that when high voltage supply HV is discharged through fusible member 70, the input voltage to voltage regulator 161A may temporarily drop below 30V, thereby causing a corresponding drop in the low voltage supply V. However, since the reaction system has already been triggered, it is no longer necessary for the detection system to continue to function as described and any drop in low voltage supply V will not impair the functioning of safety system 18.

It will be appreciated by those of skill in the electrical arts that the alternative embodiments of excitation system 101A, monitoring system 102A, firing system 76, and electrical supply system 154A may be implemented on a single substrate and/or in a single package. Additionally, the particular values for the various electrical circuit elements described above may be varied depending on the application.

One limitation of the monitoring systems of FIGS. 9 and 10 is that they actuate the reaction system whenever the incoming amplitude from charge plate 46 drops below a preset threshold. Under most circumstances this represents a reliable triggering mechanism. However, when cutting green wood, a substantial additional capacitive and resistive load is coupled to the blade. The moisture in green wood gives it a very high dielectric constant, and an increased conductivity relative to dry wood. In fact, when cutting very green wood, i.e. over 50% moisture content, the amplitude of the signal on charge plate 46 can drop to a level equivalent to what is seen when a user contacts the blade. Thus, the systems of FIGS. 9 and 10 are limited in their ability to offer protection while processing green wood.

Figure 11:
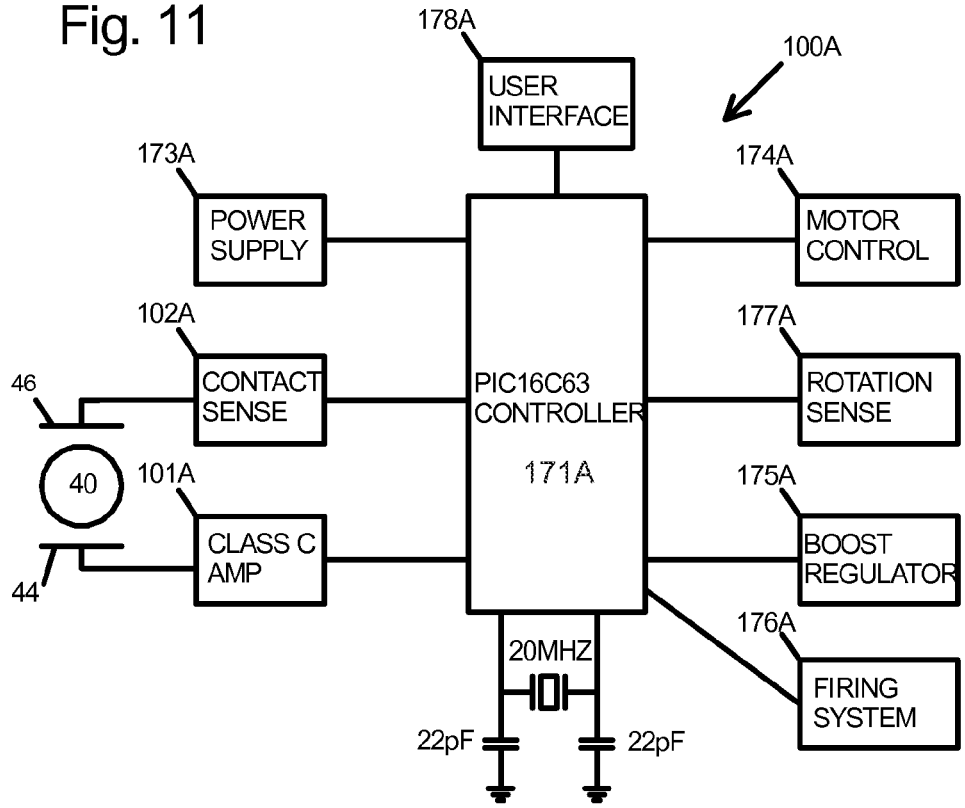
FIG. 11 is a block diagram illustrating the arrangement of a second alternative electronic subsystem.

Another embodiment of an electronic subsystem 100A adapted to accommodate green wood and offering certain other benefits is shown in FIGS. 11-19. As shown in FIG. 11, system 100A includes an excitation system 101A in the form of a class-C amplifier connected to a micro-controller 171A. System 100A also includes a monitoring system 102A in the form of a contact sense circuit connected to controller 171A. A power supply 173A supplies power to the various elements of system 100A. A motor controller 174A is adapted to turn a motor off and on based on signals from the controller. A boost regulator 175A operates to charge a firing system 176A. A rotation sense circuit 177A detects rotation of the cutting tool. Lastly, a user interface 178A is provided to allow a user to control operation of the saw and provide feedback on the status of the system.

Figure 12:
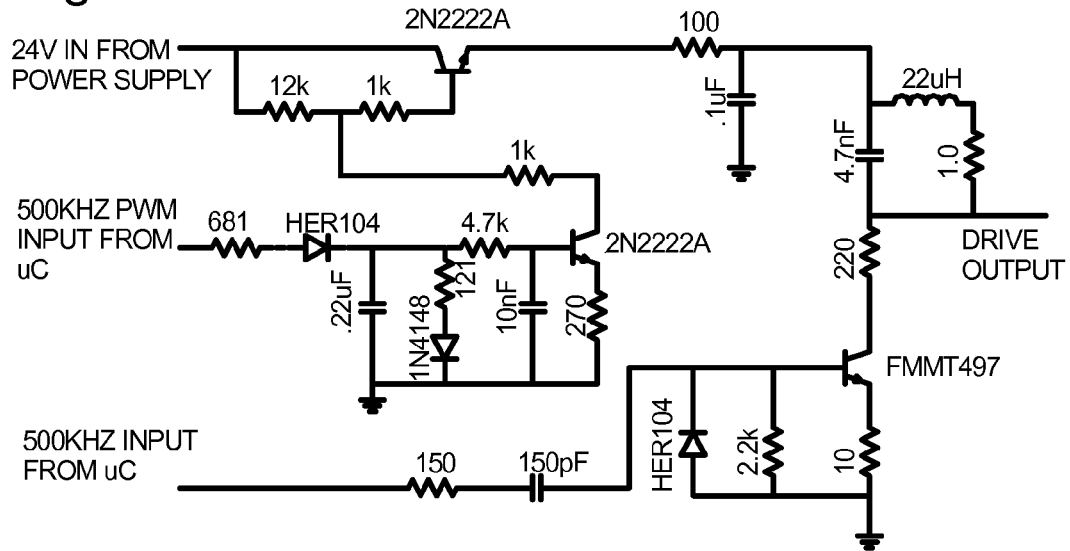
FIG. 12 is a schematic diagram of an excitation system of the subsystem of FIG. 11.

FIG. 12 illustrates the circuitry of the class-C amplifier in more detail. The amplifier includes a drive output that is coupled to plate 44 as shown in FIG. 11. The drive output is sinusoidal at about 500 khz and the amplitude is adjustable between about 3 volts and 25 volts. A 32-volt input supply line from the power supply provides power for the amplifier. The base frequency is provided by a 500 khz square wave input from the controller. The amplitude is controlled by pulse width modulation from the controller.

The controller is programmed to adjust the drive voltage output from the amplifier to maintain a predetermined amplitude at plate 46 under varying capacitive loads. Thus, when cutting green wood, the controller ramps up the drive voltage to maintain the desired voltage on plate 46. The controller is preferably capable of skewing the drive voltage between about 1 and 50% per millisecond, and more preferably between 1 and 10%. This allows the system to maintain a constant output level under the varying load created while sawing green wood, or such as might be created by placing a conductive member such a fence near the blade. The controller should preferably not skew the drive voltage by much more than 50% per millisecond, or it may counteract the drop in signal created by a user contact event.

Figure 13:
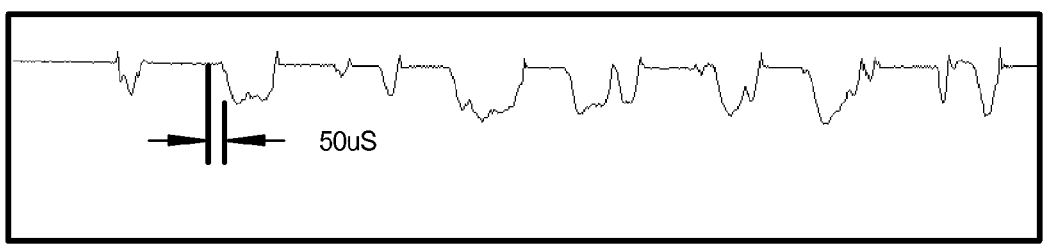
FIG. 13 shows an exemplary attenuation in signal that occurs when the finger of a user contacts a blade.

FIG. 13 illustrates the change in signal amplitude seen at plate 46 as the teeth of a 10-inch, 36-tooth saw blade spinning at 4000 rpm contacts a user's finger. Each of the drops in the signal amplitude is from a single tooth moving through the skin of the finger. It can be seen, for instance, that the signal amplitude drops by about 30% over about 500 as the second tooth strikes the finger. When cutting very green wood, the signal attenuation upon contact will be more like 15%, but will occur over the same 500. Therefore, as long as the system can detect a contact event of a 5-25% or greater drop in less than 1000, providing a skew rate of around 10% per millisecond should not override an actual event. It will be understood that the skew rate and trigger thresholds can be adjusted as desired. The primary limiting factor is that the trigger threshold should not be so small that noise creates false triggers, unless false triggers are acceptable.

Figure 14:
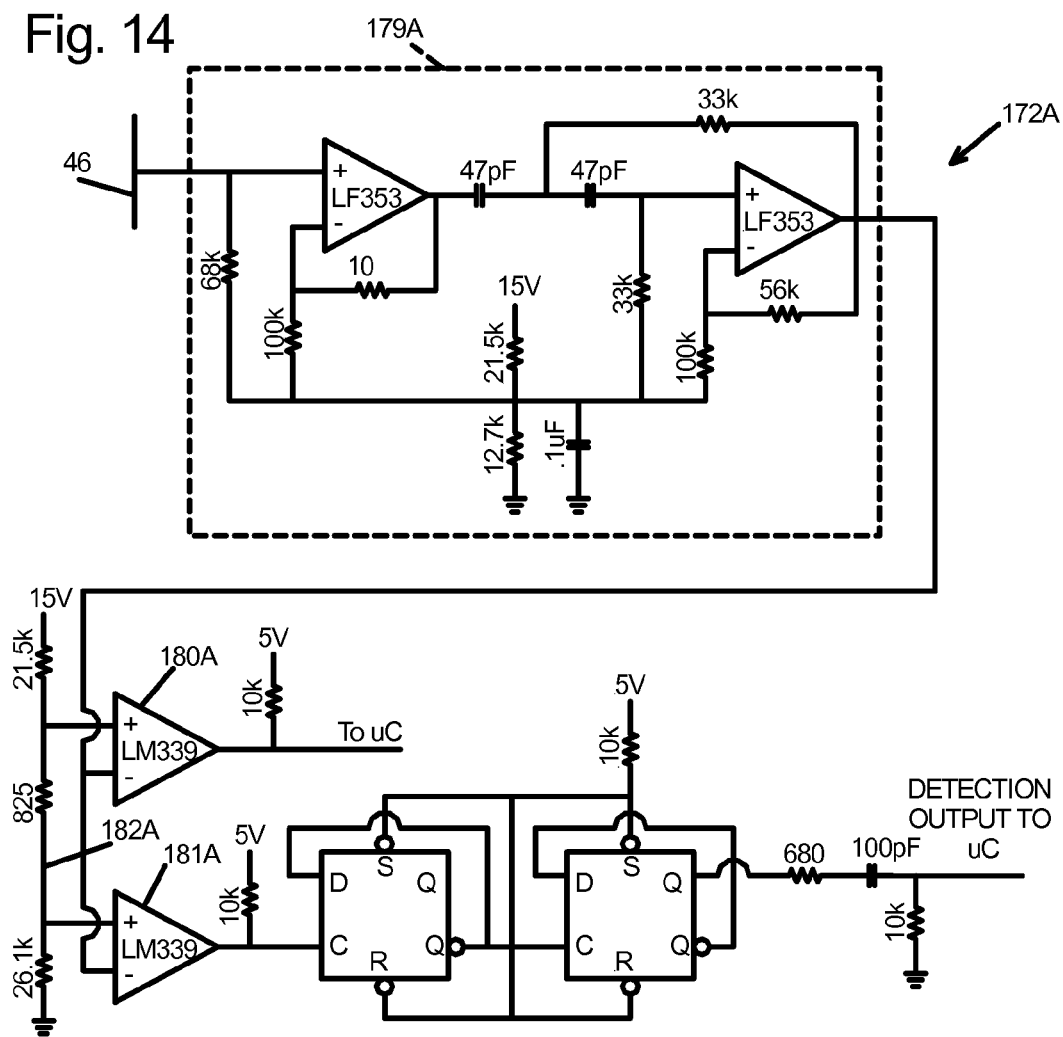
FIG. 14 is a schematic of a contact sense portion of the subsystem of FIG. 11.

FIG. 14 shows the details of the contact sense circuit. The contact sense circuit receives input from plate 46. In this embodiment, the preferred capacitive coupling between the blade and the plates is about 30 pF for the drive plate and about 10 pF for plate 46. The larger drive plate size improved signal transfer for a given total capacitance of both plates. The actual values are not critical, and equal values could be used as well. Generally speaking, the capacitance of the drive plate should be comparable to the human body capacitance to be detected, i.e. 10-200 pF.

The input from plate 46 is fed through a high-pass filter 179A to attenuate any low frequency noise, such as 60 hz noise, picked up by plate 46. Filter 179A can also provide amplification of the signal to a desired level as necessary. The output of the filter is fed into a set of comparators 180A, 181A. Comparator 180A pulses high briefly if the maximum signal amplitude from the filter exceeds the value at its positive input set by voltage divider 182A. The output pulses from the comparator are fed to the controller. The controller samples over a 200 μS window and modulates the drive amplitude to attempt to maintain the sensed voltage at a level so that 50% of the waveform cycles generate a pulse through comparator 180A. If less than 50% generate pulses, then the controller raises the drive voltage by a set amount. Likewise, if more than 50% generate pulses, the drive voltage is lowered. The system can be configured to step by larger or smaller amounts depending on the deviation from 50% observed during a particular window. For instance, if 45 pulses are observed, the system may step up the drive amplitude by 1%. However, if only 35 pulses are observed, the system may step by 5%. The system will continually "hunt" to maintain the proper drive level. By selecting the window duration and adjustment amount, it is possible to control the skew rate to the desired level as described above.

Comparator 181A pulses every cycle of the waveform so long as the sensed voltage exceeds a lower trigger threshold set by voltage divider 182A. Therefore, under normal circumstances, this is a 500 khz pulse. The pulse output from comparator 181A is fed through a divide-by-four circuit formed by two D-flip flops to reduce the frequency to 125 khz—or an 8 μS period. The output of the divider is fed to the controller. The controller monitors this line to insure that a pulse occurs at least every 18 μS. Therefore, if more than about half of the pulse are missing in over an 18 μS period, the controller will trigger the reaction system. Of course, the particular period can be selected as desired to maximize reliability of contact detection and minimize false triggers. A benefit of the described arrangement is that a single pulse or even two may be missing, such as due to noise, without triggering the system. However, if more pulses are missing, the system will still be triggered reliably. The particular trigger level for missing pulses is set by the voltage divider. This level will typically be between 5 and 40% for the described system.

Figure 15:
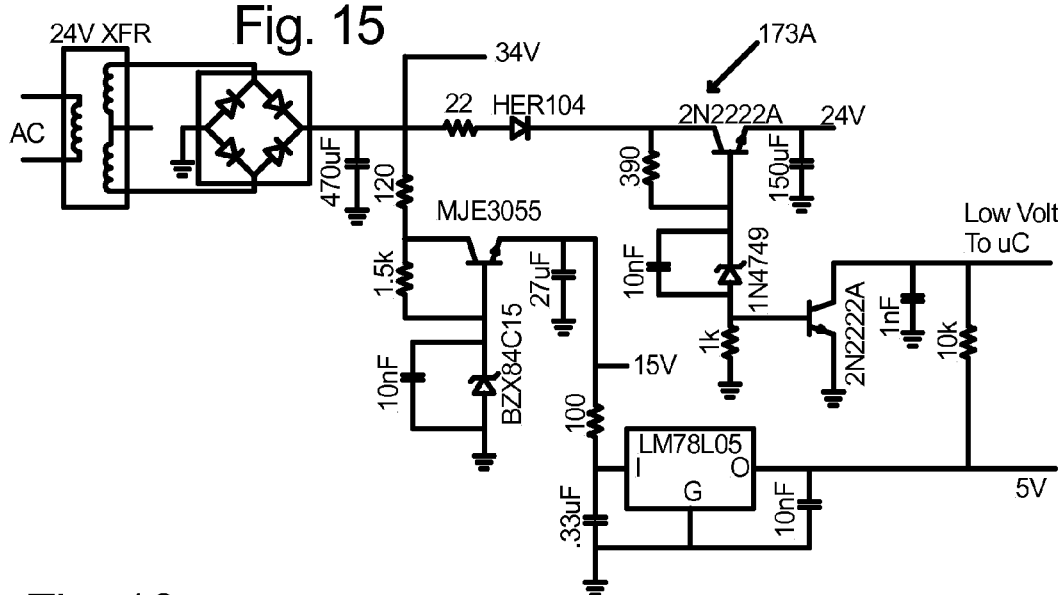
FIG. 15 is a schematic of a power supply of the subsystem of FIG. 11.

FIG. 15 illustrates the circuit of power supply 173A. The power supply includes an unregulated 32-volt output and regulated 5, 15 and 24-volt outputs. The 24-volt output is used to power the excitation signal, which has a relatively large voltage, and the 32-volt output powers a capacitor charging circuit described below. The 5-volt output powers the controller and other logic circuitry, while the 15-volt output operates most of the analog electronics. A low-voltage output is monitored by the controller to insure that adequate voltage is present to operate the system.

Figure 16:
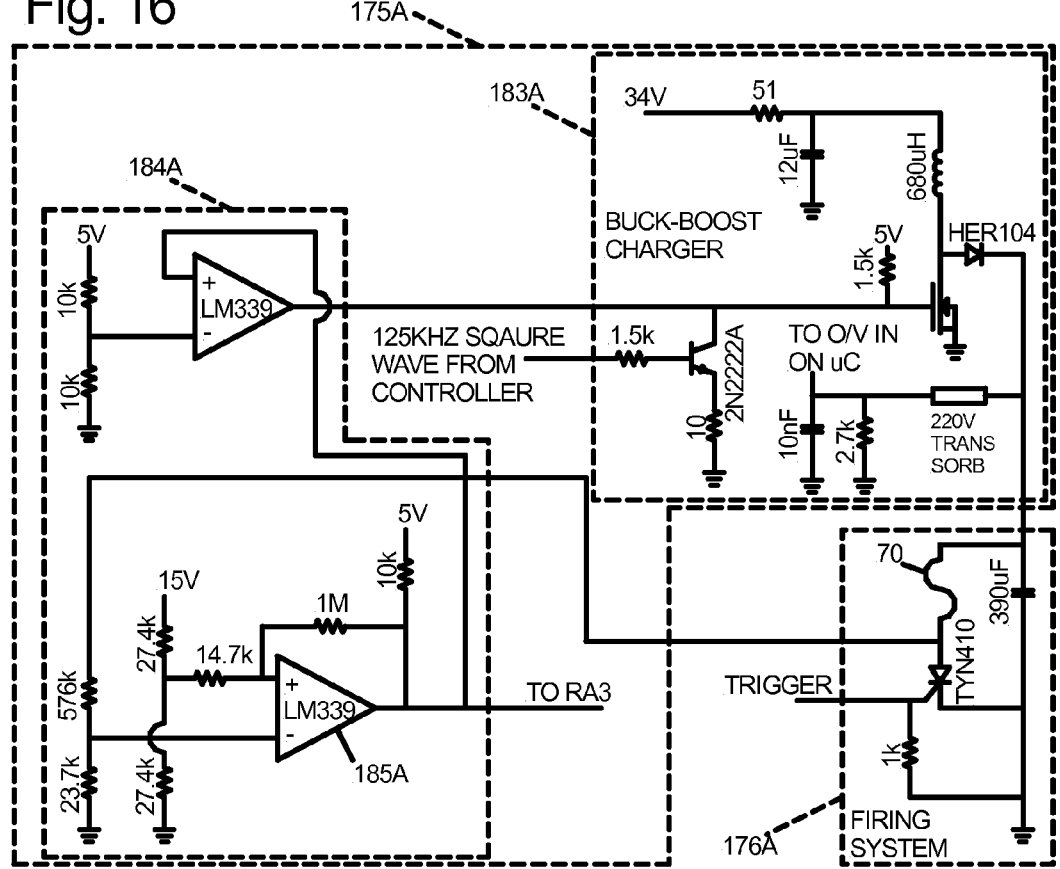
FIG. 16 is a schematic of a boost regulator portion and a firing portion of the subsystem of FIG. 11.

Boost regulator 175A and firing system 176A are shown in FIG. 16. Boost regulator 175A includes a buck-boost charger 183A that steps up the 32-volt supply input to 180 volts for charging the firing circuit. The controller provides a 125 khz input to modulate the buck-boost cycle of the charger. A regulator circuit 184A monitors the voltage from the firing circuit and turns the charger on or off as necessary to maintain the charge near 180 volts. The regulator circuit is constructed with a predetermined amount of hysteresis so that the charger will turn on when the firing circuit voltage falls below 177 volts and turn off when the voltage reaches 180 volts, as set by the voltage divider inputs and feedback to comparator 185A. The output of comparator 185A is fed to the controller. By monitoring the charge and discharge time based on the state of the output of comparator 185A, the controller can verify that the capacitor in the firing circuit is operating properly and storing adequate charge. An over-voltage circuit uses a 220V transient suppressor to signal the controller if the voltage on the capacitor exceeds about 220V. This testing is described in more detail in U.S. Provisional Patent Application Ser. No. 60/225,059, titled "Logic Control for Fast-Acting Safety System," filed Aug. 14, 2000. The firing circuit is described in more detail in U.S. Provisional Patent Application Ser. No. 60/225,056, titled "Firing Subsystem for Use in a Fast-Acting Safety System," filed Aug. 14, 2000.

Figure 17:
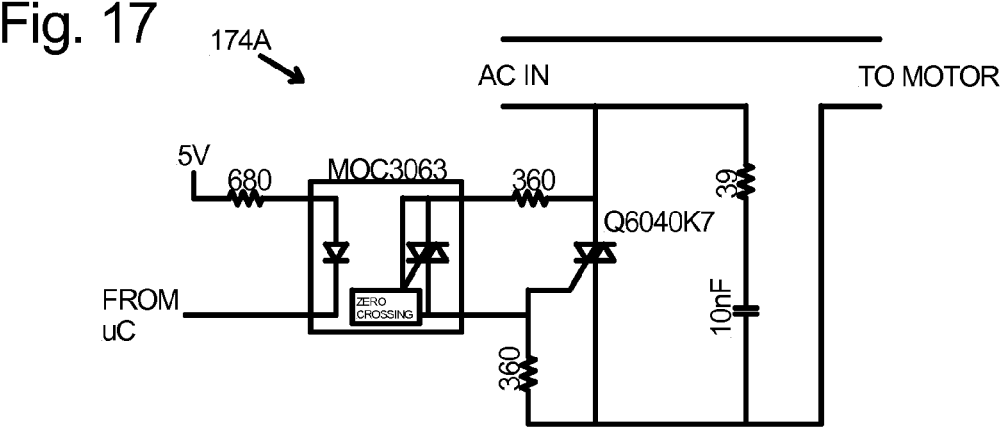
FIG. 17 is a schematic of a motor control portion of the subsystem of FIG. 11.

FIG. 17 illustrates the circuitry of motor control 174A. The motor control receives a logic level control signal from the controller to turn the motor on and off based on input from the user interface, described in more detail below. The motor control also turns off the motor when a trigger event occurs. The logic signal is electrically isolated from the motor voltage by an optoisolated triac driver. This isolates the ground of the detection system from the ground of the motor power. A mechanical relay or similar device can also be used and will provide the same isolation. When the optoisolated triac drive receives a signal from the controller, it turns on Q6040K7 triac to provide power to the machine.

Figure 18:
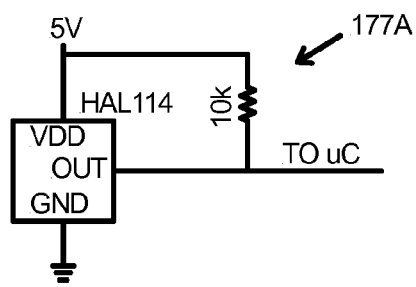
FIG. 18 is a schematic of a rotation sensor portion of the subsystem of FIG. 11.

The rotation sense circuit is shown in FIG. 18. The purpose of the rotation sense circuit is to insure that the contact detection system is not turned off until the cutter or blade as stopped. The rotation sense circuit utilizes a hall-effect sensor that is located adjacent a rotating portion of the machine. A small magnet is inserted in the rotating portion to signal the hall-effect sensor. Output of the hall-effect sensor is fed to the controller. As described in more detail in U.S. Provisional Patent Application Ser. No. 60/225,059, titled "Logic Control for Fast-Acting Safety System," filed Aug. 14, 2000, the controller monitors the output of the hall-effect sensor to determine when the cutter has coasted to a stop. Once the cutter stops, any sensed contact will no longer trigger the reaction system. It should be noted that rotation of the cutter could be detected by other arrangements as well. Various suitable mechanisms are described in U.S. Provisional Patent Application Ser. No. 60/225,094, titled "Motion Detecting System for Use in Safety System for Power Equipment," filed Aug. 14, 2000.

For instance, a small eccentricity can be placed on the cutter or some other isolated structure that rotates with the cutter, such as the arbor. This eccentricity can be placed to pass by sense plate 46 or by a separate sensing plate. The eccentricity will modulate the detected signal amplitude so long as the cutter is rotating. This modulation can be monitored to detect rotation. If the eccentricity is sensed by sense plate 46, it should be small enough that the signal modulation generated will not register as a contact event. As another alternative, rotation can be sensed by electromagnetic feedback from the motor.

Controller 171A may also be designed to monitor line voltage to insure that adequate voltage is present to operate the system. For instance, during motor start up, the AC voltage available to the safety system may drop nearly in half depending on the cabling to the saw. If the voltage drops below a safe level, the controller can shut off the saw motor. Alternatively, the controller may include a capacitor of sufficient capacity to operate the system for several seconds without power input while the saw is starting.

Figure 19:
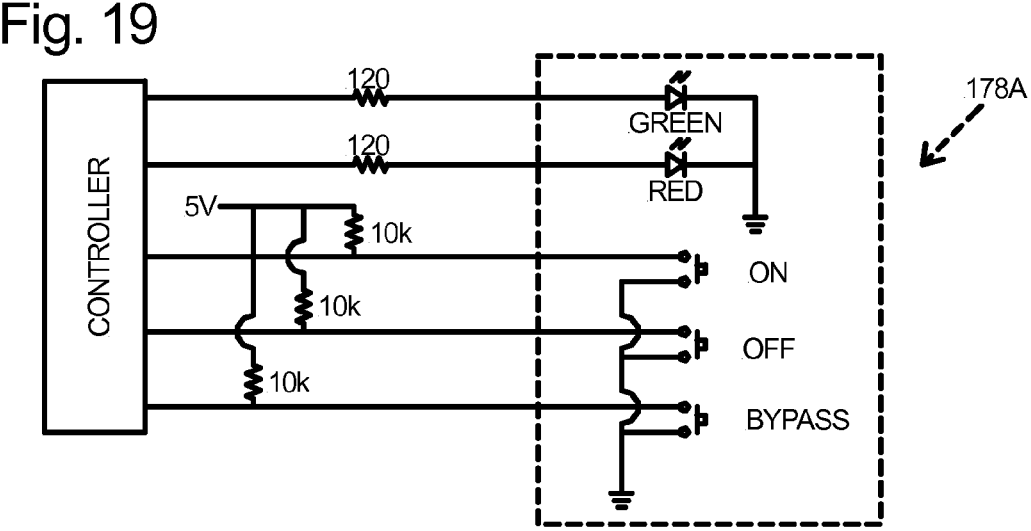
FIG. 19 is a schematic of a user interface portion of the subsystem of FIG. 11.
Figure 20:
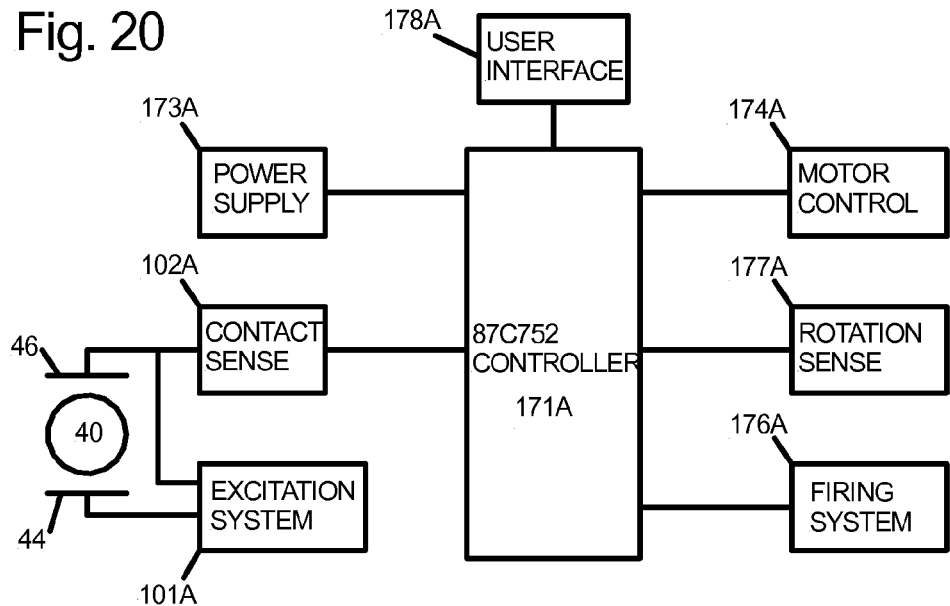
FIG. 20 is a block diagram of second and third alternative electronic subsystems.

User interface 178A is shown in FIG. 19. The user interface includes start, stop and bypass buttons that are used to control the operation of the saw. The bypass button allows the user to disable the contact detection system for a single on/off cycle of the saw so as to be able to saw metal or other materials that would otherwise trigger the reaction system. The user interface also includes red and green LEDs that are used to report the status of the system to a user. More details on the operation of suitable user interfaces are described in U.S. Provisional Patent Application Ser. No. 60/225,059, titled "Logic Control for Fast-Acting Safety System," filed Aug. 14, 2000.

Figure 21:
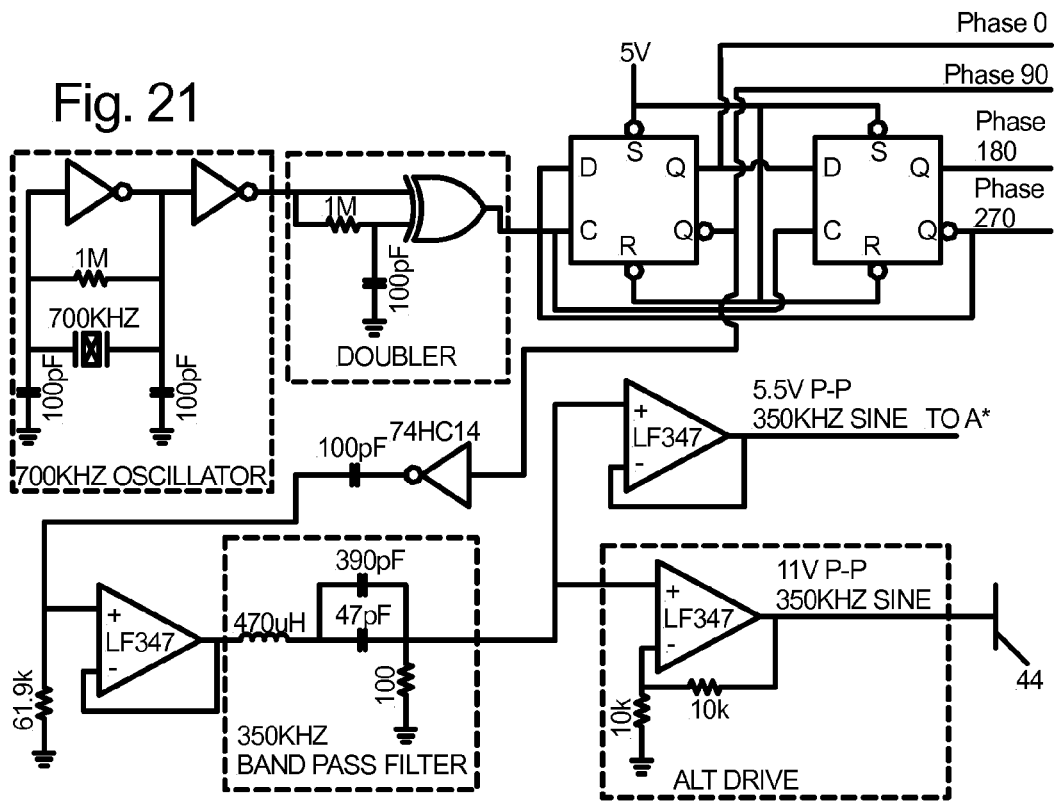
FIG. 21 is a schematic of an excitation system portion of the subsystems of FIG. 20.

Two additional electronic configurations for detection subsystem 22 are shown in FIGS. 20-24. As illustrated in FIG. 21, the alternative detection systems utilize a microcontroller 171A to manage and monitor various functions. An excitation system delivers a 350 khz sine wave drive signal through plate 44 to the blade. The circuit for generating the drive signal is illustrated in FIG. 21. The excitation circuit uses a 700 khz oscillator with an output fed into a double to generate a 1.4 Mhz signal. The output of the double is fed into a set of S-R flip-flops to extract phase signals at 90-degree intervals. The phase signals are used to drive a synchronous detection system that forms on of the two embodiments of FIGS. 20-24 and is shown in more detail in FIG. 23. The 350 khz square wave 180-degree phase signal is fed through an inverter and a buffer amplifier into a Q=10, 350 khz band pass filter.

Figure 22:
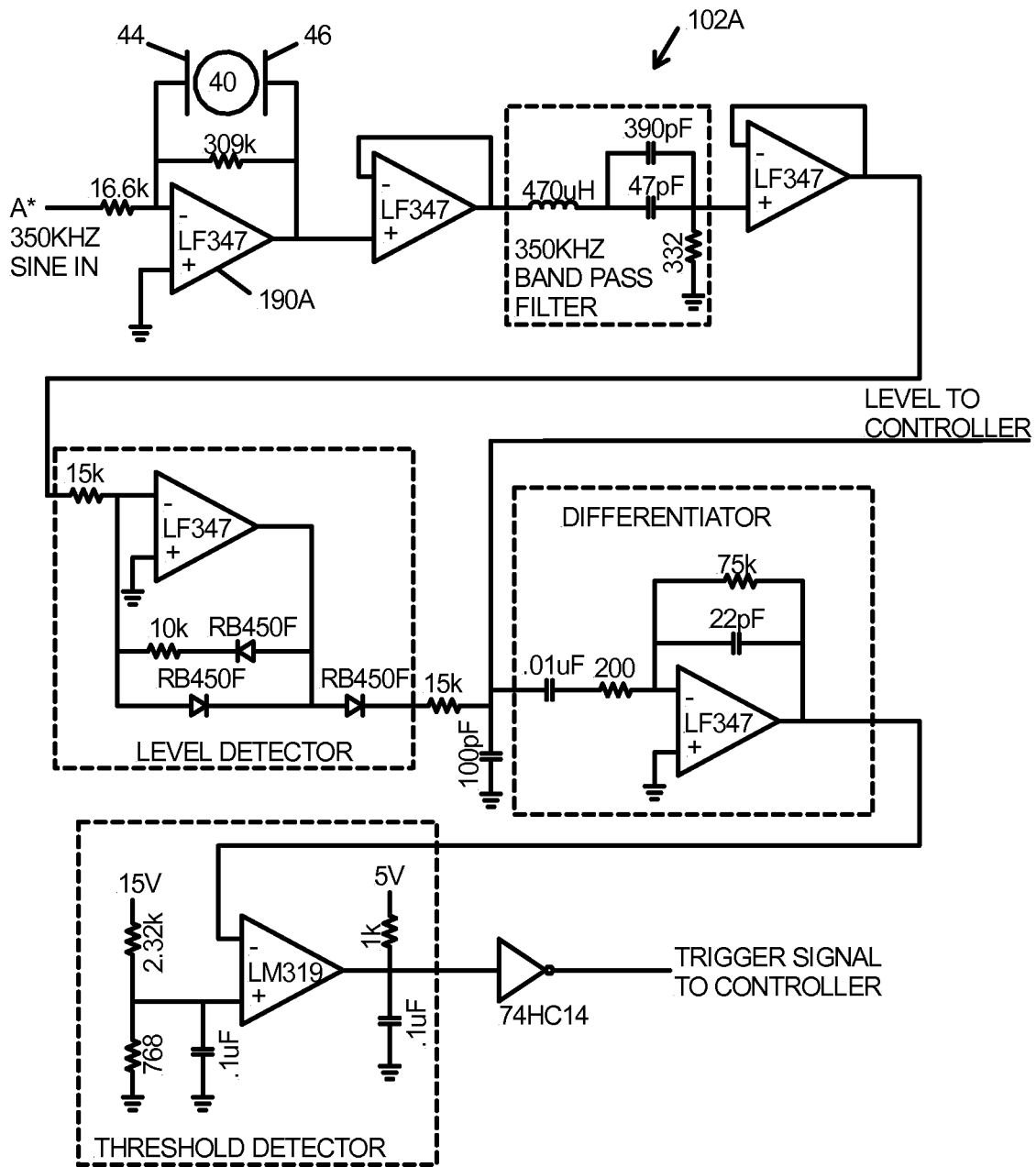
FIG. 22 is a schematic of a contact sense portion of the second alternative subsystem of FIG. 20.

The output of the band pass filter is a 350 khz sine wave that is fed through another buffer amplifier to a sense amplifier 190A shown in FIG. 22. The output of the sense amplifier is fed to plate 44 and the input from plate 46 is fed back to the negative input. When a user touches cutter 40, the feedback on the sense amplifier is reduced, thereby causing the output amplitude to go up. The result of this arrangement is that the drive amplitude on the blade is small during normal use and rises only when a user touches the blade or green wood is cut. In this embodiment, the preferred capacitive coupling of the plates to the blade is about 90 pF each, although other values could be used.

The output of the sense amplifier is fed through a buffer and into a 350 khz band pass filter to filter out any noise that may have been picked up from the blade or plates. The output of the band pass filter is fed through a buffer and into a level detector. The level detector generates a DC output proportional to the amplitude of the sense amplifier. The output of the level detector is smoothed by an RC circuit to reduce ripple and fed into a differentiator. The differentiator generates an output proportional to the rate of change of the sense amplifier output amplitude.

As mentioned above, the sense amplifier output only changes when a user touches the blade or green wood is cut. The change when cutting green wood is slow relative to what happens when a user touches the blade. Therefore, the differentiator is tuned to respond to a user contact, while generating minimal response to green wood. The output of the differentiator is then fed to a comparator that acts as threshold detector to determine if the output of the differentiator has reached a predetermined level set by the a voltage divider network. The output of the threshold detector is fed through a Schmitt-trigger that signals the controller that a contact event has occurred. An RC network acts as a pulse stretcher to insure that the signal lasts long enough to be detected by the controller.

The output from the level detector is also fed to and analog to digital input on the controller. It may be that the under some circumstances, such as while cutting extremely green wood, the response of the sense amplifier will be near saturation. If this happens, the amplifier may no longer be capable of responding to a contact event. In order to provide a warning of this situation, the controller monitors this line to make sure that the detected level is stays low enough to allow a subsequent contact to be detected. If an excess impedance load is detected, the controller can shut down the saw without triggering the reaction system to provide the user with a warning. If the user wants to continue, they can initiate the bypass mode as described above.

Figure 23:
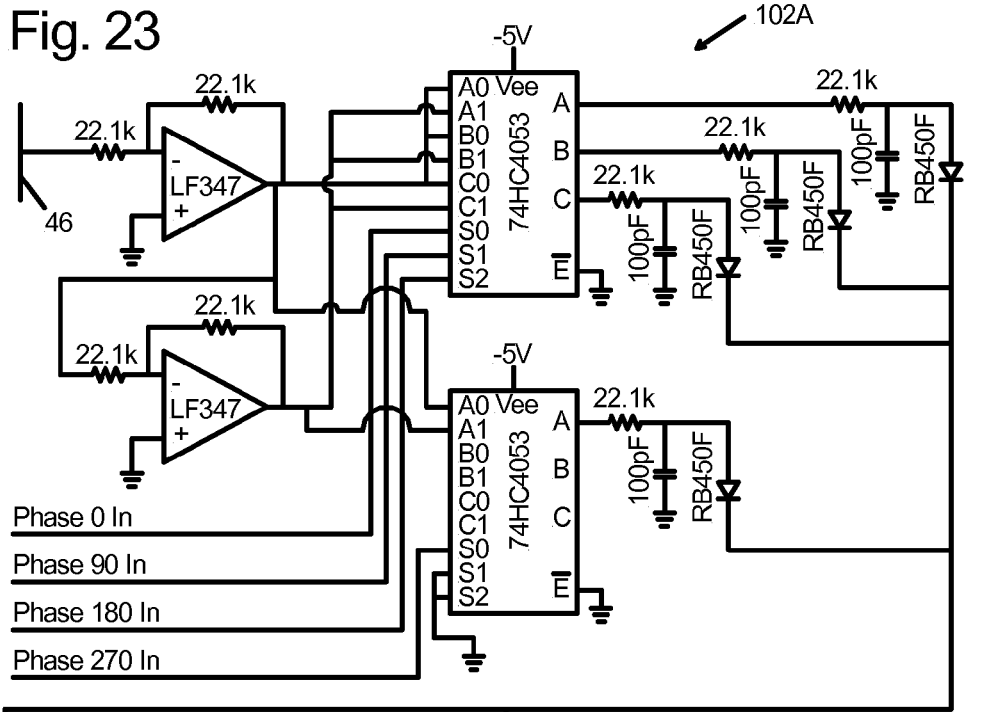
FIG. 23 is a schematic of a contact sense portion of the third alternative subsystem of FIG. 20.
Figure 23:
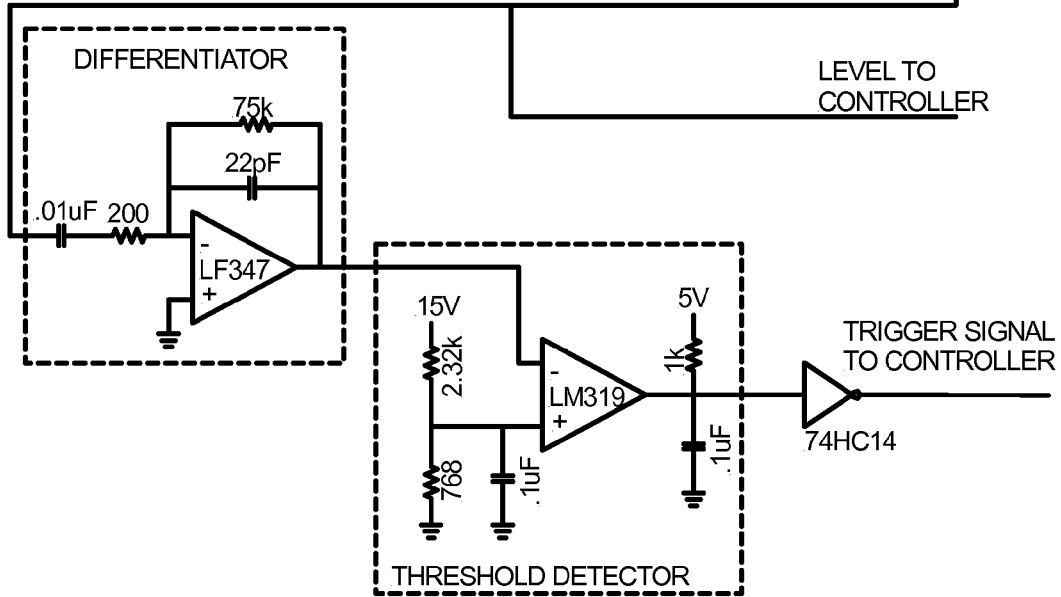

The second of the two alternative detection systems of FIGS. 20-24 is a synchronous detector that uses the phase information generated by the flip-flops in FIG. 21. This system drives plate 44 through the ALT DRIVE circuit shown in FIG. 21. This ALT DRIVE circuit and the detection circuit of FIG. 23 are substituted for the circuit of FIG. 22. As shown in FIG. 23, the signal from plate 46 is fed through a pair of buffer/amplifiers into a set of analog switches. The switches are controlled by the phase information from the flip-flops. This arrangement generates an output signal that is proportional to the amplitude of the signal detected from plate 46 with improved noise immunity because of the synchronous detection. The output signal is fed into a differentiator and threshold detector circuit as previously described. These circuits send a trigger signal to the controller when the detected signal amplitude drops at a rate sufficient for the differentiator to have an output exceeding the threshold level.

Figure 24:
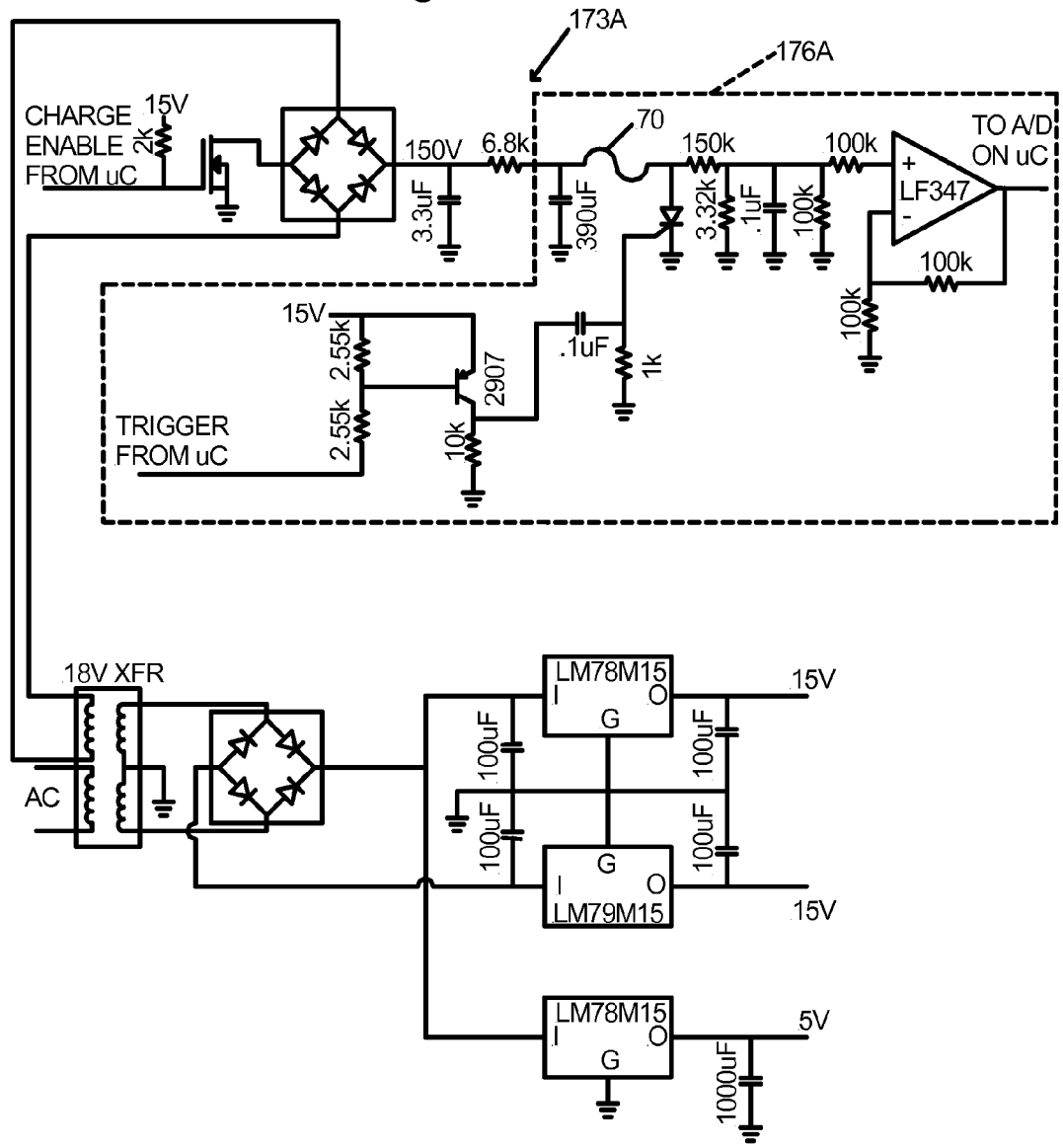
FIG. 24 is a schematic of a power supply and firing system portion of the subsystems of FIG. 20.

FIG. 24 illustrates a power supply and firing system suited for use in these two alternative arrangements. The power supply generates plus and minus 15-volt levels, as well as a 5-volts level. The capacitor in the firing circuit is charged by a secondary input winding on the power transformer. This arrangement provides for isolation of the system ground from the machine ground and avoids the need to step up power supply voltage to the capacitor voltage as accomplished by boost regulator 175A. However, the capacitor charge voltage becomes dependent on the line voltage, which is somewhat less predictable.

The charging circuit for the capacitor is regulated by an enable line from the controller. By deactivating the charging circuit, the controller can monitor the capacitor voltage through an output to an A/D line on the controller. When the capacitor is not being charged, it should discharge at a relatively know rate through the various paths to ground. By monitoring the discharge rate, the controller can insure that the capacitance of the capacitor is sufficient to burn the fusible member. The trigger control from the controller is used to fire the SCR to burn the fusible member.

With any of the above electronic subsystems, it is possible to avoid triggering in the event metal or metal-foiled materials are cut by looking for the amplitude of the signal, or the rate of change, depending on the system, to fall within a window or band rather than simply exceeding or falling below a certain threshold. More particularly, when metal is cut, the detected signal will drop to almost zero, and will drop within a single cycle. Thus, the controller or threshold detection circuitry can be configured to look for amplitude change of somewhat less than 100%, but more than 10% as a trigger event, to eliminate triggering on metal or other conductive work pieces which would normally substantially completely ground the signal.

It should be noted that, although not essential, all of the described embodiments operate at a relatively high frequency—above 100 kHz. This high frequency is believed to be advantageous for two reasons. First, with a high frequency, it is possible to detect contact more quickly and sample many cycles of the waveform within a short period of time. This allows the detection system to look for multiple missed pulses rather than just one missed pulse, such as might occur due to noise, to trigger the reaction system. In addition, the higher frequency is believed to provide a better signal to noise ratio when cutting green wood, which has a lower impedance at lower frequencies.

INDUSTRIAL APPLICABILITY

The systems and components disclosed herein are applicable to power equipment. It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
a circular blade;
a motor that spins the blade;
electronics that detect contact between the blade and a person;
a safety system that stops or retracts the blade when contact between the blade and a person is detected;
a switch that is switchable between an "on" position and an "off" position to start and stop the motor;
a first light that illuminates to indicate the safety system is operable; and
a second light that illuminates to indicate that the safety system is inoperable;
where the motor will not begin spinning the blade when the switch is switched from the "off" position to the "on" position if the second light is illuminated and the safety system is not then stopping or retracting the blade.

* * * * *

UNITED STATES PATENT AND TRADEMARK OFFICE
CERTIFICATE OF CORRECTION

Page 1 of 1

PATENT NO. : 9,925,683 B2
APPLICATION NO. : 14/862571
DATED : March 27, 2018
INVENTOR(S) : Stephen F. Gass, J. David Fulmer and David A. Fanning It is certified that error appears in the above-identified patent and that said Letters Patent is hereby corrected as shown below:

In the Claims

Column 27 In Claim 1, Line 16, delete "indicate that the" and insert --indicate the--.

Signed and Sealed this
Second Day of October, 2018

Andrei Iancu
*Director of the United States Patent and Trademark Office*